United States Patent
Cheng et al.

(10) Patent No.: US 10,657,582 B2
(45) Date of Patent: *May 19, 2020

(54) METHOD, USER TERMINAL, AND SERVICE TERMINAL FOR PROCESSING SERVICE DATA

(71) Applicant: Tencent Technology (Shenzhen) Company Limited, Shenzhen (CN)

(72) Inventors: Shihai Cheng, Shenzhen (CN); Kai Liu, Shenzhen (CN); Yu Li, Shenzhen (CN); Liangliang Fan, Shenzhen (CN); Xiangyao Lin, Shenzhen (CN); Chenglin Liu, Shenzhen (CN); Jinhai Liu, Shenzhen (CN); Yaobo Hua, Shenzhen (CN); Anqi Ren, Shenzhen (CN); Bin Huang, Shenzhen (CN)

(73) Assignee: Tencent Technology (Shenzhen) Company Limited, Shenzhen, Guangdong Province (CN)

(*) Notice: Subject to any disclaimer, the term of this patent is extended or adjusted under 35 U.S.C. 154(b) by 253 days.

This patent is subject to a terminal disclaimer.

(21) Appl. No.: 15/802,346

(22) Filed: Nov. 2, 2017

(65) Prior Publication Data
US 2018/0068378 A1    Mar. 8, 2018

Related U.S. Application Data

(63) Continuation of application No. 15/157,180, filed on May 17, 2016, now Pat. No. 9,836,779, which is a
(Continued)

(30) Foreign Application Priority Data

Apr. 22, 2014 (CN) .......................... 2014 1 0165601

(51) Int. Cl.
*G06Q 30/00* (2012.01)
*G06Q 30/06* (2012.01)
(Continued)

(52) U.S. Cl.
CPC ....... *G06Q 30/0637* (2013.01); *G06K 7/1417* (2013.01); *G06Q 20/00* (2013.01);
(Continued)

(58) Field of Classification Search
CPC .. G06Q 30/0637; G06Q 20/00; G06Q 20/327; G06K 7/1417; H04L 2463/102;
(Continued)

(56) References Cited

U.S. PATENT DOCUMENTS 5,630,908 A    5/1997  Viertola
5,724,424 A    3/1998  Gifford
(Continued)

FOREIGN PATENT DOCUMENTS

CN    101179757 A    5/2008
CN    101482950 A    7/2009
(Continued)

OTHER PUBLICATIONS

Penny Crosman "Managing Online Auction: Current Business and Research Issues" American Banker Nye York, NY Nov. 9, 2016.
(Continued)

*Primary Examiner* — Naeem U Haq
(74) *Attorney, Agent, or Firm* — Morgan, Lewis & Bockius LLP

(57) ABSTRACT

A service terminal, which is communicatively coupled to a remote server, communicates with an offline mobile phone located nearby via a short-range wireless communication protocol to complete a service request initiated by the mobile phone. The service terminal repeatedly broadcasts, via a short-range wireless transceiver, a service message to
(Continued)

neighboring mobile terminals until after receiving a service purchase request message from one of the mobile terminals. The service terminal then suspends the broadcast of the service message and submits the service purchase request to the remote server and then receives a purchase confirmation message from the remote server. Next, the service terminal transmits, via the short-range wireless transceiver, the purchase confirmation message back to the user terminal.

20 Claims, 6 Drawing Sheets

Related U.S. Application Data continuation of application No. PCT/CN2014/092078, filed on Nov. 24, 2014.

(51) Int. Cl.

| | | |
|---|---|---|
| *G06Q 20/00* | (2012.01) | |
| *H04W 4/06* | (2009.01) | |
| *H04L 29/06* | (2006.01) | |
| *G06Q 20/32* | (2012.01) | |
| *H04W 12/02* | (2009.01) | |
| *H04W 4/80* | (2018.01) | |
| *G06K 7/14* | (2006.01) | |
| *H04W 8/00* | (2009.01) | |
| *H04W 12/00* | (2009.01) | |
| *H04W 84/12* | (2009.01) | |

(52) U.S. Cl.
CPC .......... *G06Q 20/327* (2013.01); *H04L 69/22* (2013.01); *H04W 4/06* (2013.01); *H04W 4/80* (2018.02); *H04W 8/005* (2013.01); *H04W 12/02* (2013.01); *H04L 2463/102* (2013.01); *H04W 12/00522* (2019.01); *H04W 84/12* (2013.01)

(58) Field of Classification Search
CPC .......... H04L 69/22; H04W 4/06; H04W 4/80; H04W 12/02; H04W 12/00522; H04W 8/005; H04W 84/12
See application file for complete search history.

(56) References Cited

U.S. PATENT DOCUMENTS

| | | | |
|---|---|---|---|
| 6,587,835 B1 | 7/2003 | Treyz et al. | |
| 8,320,894 B1* | 11/2012 | Raghunath | ........ H04M 3/42229 |
| | | | 370/310.2 |
| 8,514,907 B2 | 8/2013 | Wright et al. | |
| 9,208,492 B2 | 12/2015 | Hoyos | |

FOREIGN PATENT DOCUMENTS

| | | |
|---|---|---|
| CN | 101576982 A | 11/2009 |
| CN | 104144379 A | 11/2014 |
| KR | 20030056947 A | 7/2003 |
| KR | 20090068540 A | 6/2009 |
| KR | 20100087271 A | 8/2010 |

OTHER PUBLICATIONS

Tencent Technology, ISRWO, PCT/CN2014/092078, dated Feb. 11, 2015, 7 pgs.
Tencent Technology, IPRP, PCT/CN2014/092078, dated Oct. 25, 2016, 5 pgs.

* cited by examiner

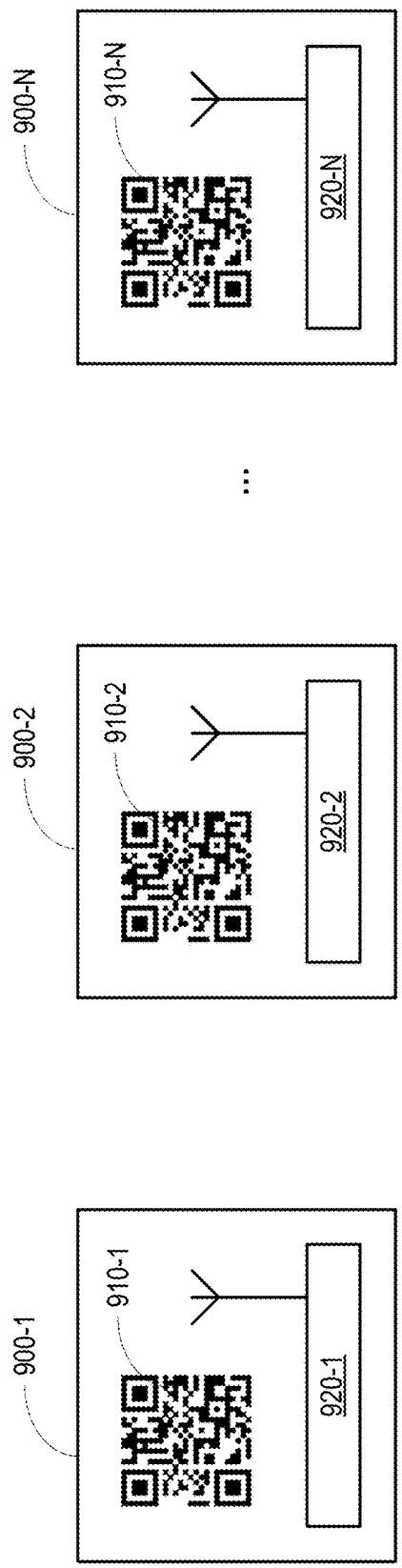
FIG. 9A
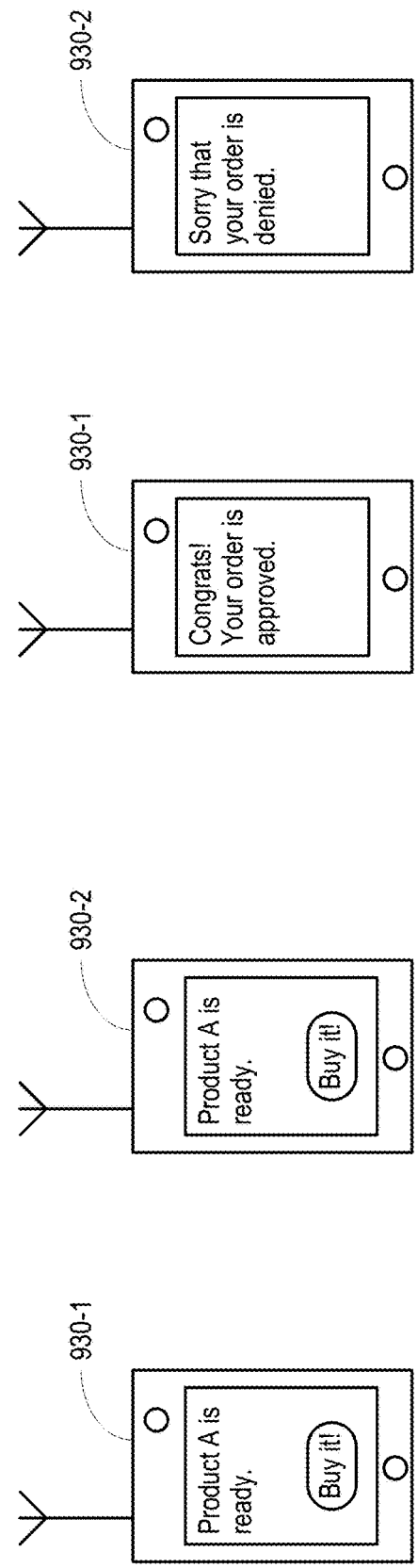
FIG. 9B
FIG. 9C

METHOD, USER TERMINAL, AND SERVICE TERMINAL FOR PROCESSING SERVICE DATA

RELATED APPLICATIONS

This application is a continuation of U.S. patent application Ser. No. 15/157,180, entitled "METHOD, USER TERMINAL, AND SERVICE TERMINAL FOR PROCESSING SERVICE DATA" filed on May 17, 2016, which is a continuation of PCT Patent Application No. PCT/CN2014/092078, entitled "METHOD, USER TERMINAL, AND SERVICE TERMINAL FOR PROCESSING SERVICE DATA" filed on Nov. 24, 2014, which claims priority to Chinese Patent Application No. 201410165601.8, "METHOD, USER TERMINAL, AND SERVICE TERMINAL FOR SERVICE DATA PROCESSING," filed on Apr. 22, 2014, the entirety of which are hereby incorporated by reference in their entirety.

TECHNICAL FIELD

The present application relates to the field of communications technologies, and in particular, to a method, a user terminal, and a service terminal for processing service data.

BACKGROUND

The development of Internet technologies provides great convenience for the life and work of people. At present, a terminal needs to send a service request to a service server online when subscribing a service, so that the service server processes a corresponding service according to the service request. For example, at present, a user may send a payment request to a payment service server by surfing the Internet with a mobile phone, so that the payment service server completes a payment operation according to the payment request.

However, it cannot be ensured that the terminal is definitely in an online state. For example, when a user terminal uses a wireless network, the following case may occur: there is no network signal or a network signal is too weak, leading to communication failure or poor communication quality. In this case, it is difficult for the user terminal to request a service server to execute a corresponding service operation.

SUMMARY

The above deficiencies and other problems associated with the conventional approach when the user terminal is in an off-line state are reduced or eliminated by the invention disclosed below. In some embodiments, the present application is implemented in a service terminal and a user terminal that communicates with the service terminal wirelessly, each terminal having one or more processors, memory and one or more modules, programs or sets of instructions stored in the memory for performing multiple functions. The service terminal is communicatively coupled to a remote server to complete a service request initiated by the user terminal. Instructions for performing these functions may be included in a computer program product configured for execution by one or more processors.

One aspect of the present application involves a computer-implemented method performed at a service terminal having one or more processors and memory and a wireless signal transceiver. The service terminal is communicatively coupled to a remote server to complete a service request initiated by a user terminal. The computer-implemented method includes: repeatedly broadcasting a service message through the wireless signal transceiver, the service message including a service provider identifier and service-related information; receiving a first service purchase request message wirelessly transmitted from a first user terminal adjacent the service terminal, the first service purchase request message including the service-related information and service-purchasing authorization information; in response to receiving the first service purchase request message: suspending the broadcast of the service message; transmitting the service-purchasing authorization information and the service provider identifier to the remote server; receiving a purchase confirmation message from the remote server; and wirelessly transmitting the purchase confirmation message to the first user terminal. In accordance with some embodiments, a service terminal includes one or more processors, memory, a wireless signal transceiver, and one or more programs; the programs are stored in the memory and configured to be executed by the processors and the programs include instructions for performing the operations of the method described above. In accordance with some embodiments, a non-transitory computer readable storage medium has stored therein instructions which, when executed by a service terminal, cause the service terminal to perform the operations of the method described above.

Another aspect of the present application involves a computer-implemented method performed at a user terminal having one or more processors, a camera, memory and a wireless signal transceiver. The user terminal is communicatively coupled to a service terminal to complete a service request initiated by the user terminal. The computer-implemented method includes: capturing a service provider identifier embedded in a bar code adjacent a service terminal using the camera; detecting a service message through the wireless signal transceiver, the service message including the service provider identifier and service-related information; displaying the service provider identifier and the service-related information on a screen of the user terminal; in response to a user selection of the service-related information, generating and transmitting a first service purchase request message wirelessly to the service terminal using the wireless signal transceiver, the first service purchase request message including the service-related information and service-purchasing authorization information; and receiving, using the wireless signal transceiver, and displaying, on the screen, purchase confirmation message transmitted wirelessly from the service terminal. In accordance with some embodiments, a user terminal includes one or more processors, a camera, memory, a wireless signal transceiver, and one or more programs; the programs are stored in the memory and configured to be executed by the processors and the programs include instructions for performing the operations of the method described above. In accordance with some embodiments, a non-transitory computer readable storage medium has stored therein instructions which, when executed by a user terminal, cause the user terminal to perform the operations of the method described above.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

FIGS. 9A-9C are block diagrams illustrating information exchanges between service terminals and user terminals according to some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To make the objective, technical solutions, and advantages of the present application more comprehensible, the present application is further described in detail in the following with reference to the accompanying drawings and embodiments. It should be understood that the specific embodiments described herein are merely used to explain the present application rather than limit the present application.

Figure 1:
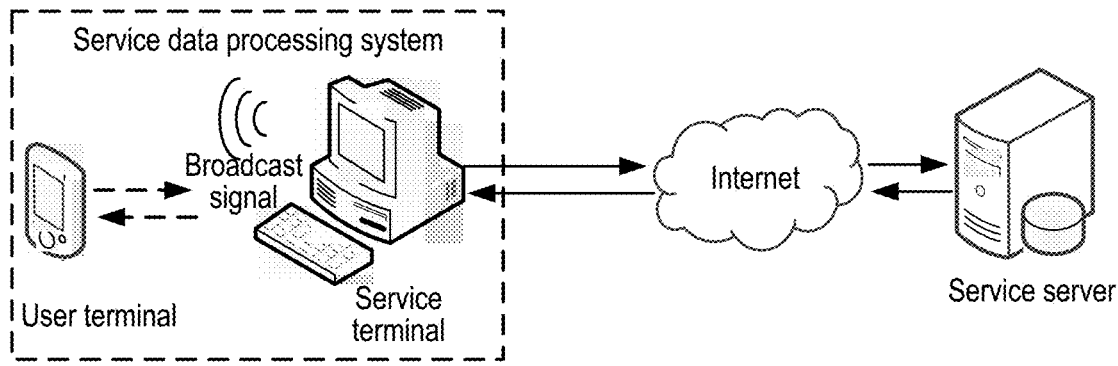
FIG. 1 is a schematic structural diagram of a service data processing system according to an embodiment.
Figure 2:
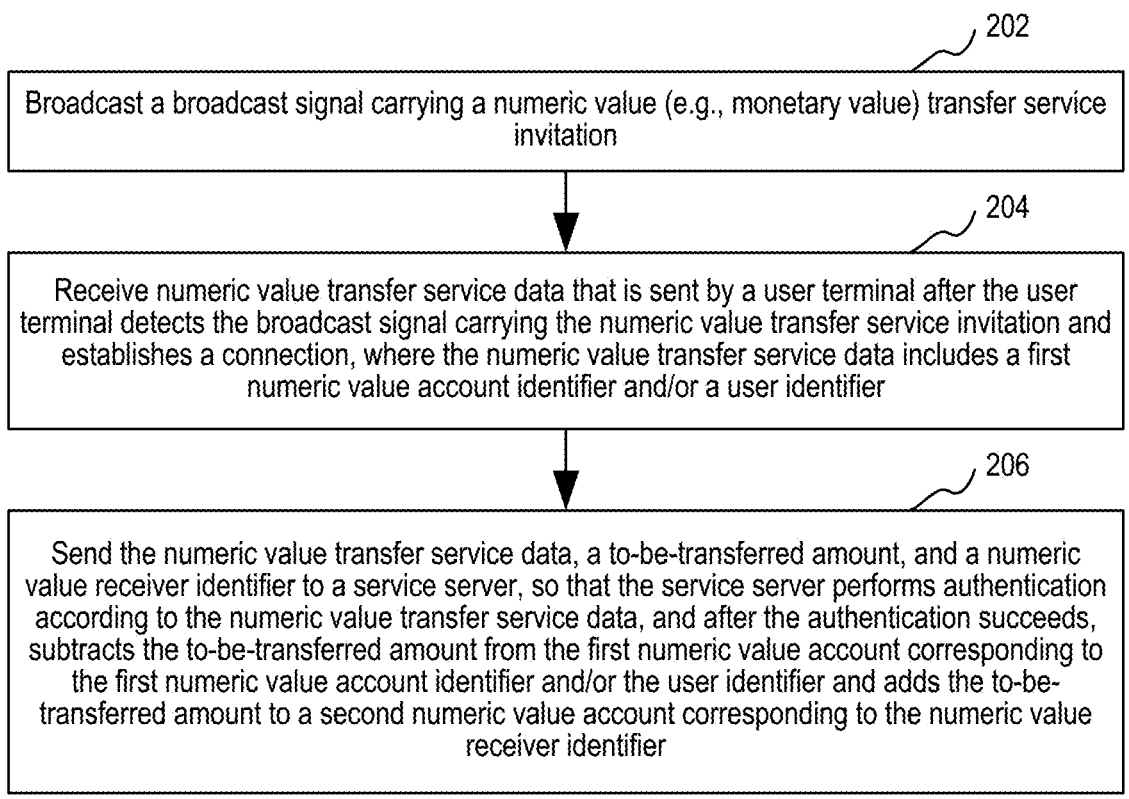
FIG. 2 is a schematic flowchart of a service data processing method according to an embodiment.

In an embodiment, a service data processing method is provided. In this embodiment, that this method is applied to a service terminal is used as an example for description, where the service terminal may be included in a service data processing system. As shown in FIG. 1, the service data processing system includes a service terminal and a user terminal, where the service terminal is connected to a service server through the Internet. The service terminal can transmit a broadcast signal, and the user terminal can detect the broadcast signal of the service terminal and establishes a wireless connection to the service terminal according to the broadcast signal. As shown in FIG. 2, the service data processing method specifically includes the following steps:

Step 202: Broadcast a broadcast signal carrying a numeric value (e.g., monetary value) transfer service invitation.

The service terminal is provided with a signal transceiver, and the service terminal broadcasts, by using the signal transceiver, a radio broadcast signal carrying a numeric value transfer service invitation. The signal transceiver may be a signal transceiver based on Bluetooth, or may be a signal transceiver based on Near Field Communication (NFC, where an effective communication distance is about 10 centimeter). The signal broadcast by using the signal transceiver may be a Bluetooth signal, an NFC signal, or a sound wave signal.

The numeric value transfer service invitation refers to information for requesting the user terminal to grant authorization to transfer a pre-agreed specific numeric value. The specific numeric value may be, for example, a numeric value of a virtual currency (for example, a numeric value of a bank account or a numeric value of a fund account in the service server), or may be another transferable numeric value.

The numeric value transfer service invitation may be indicated by using a pre-agreed service identifier, where the service identifier may be a universally unique identifier (UUID). When the user terminal detects that a broadcast signal carries the service identifier, it means that the broadcast signal carries the numeric value transfer service invitation. The service terminal may convert the numeric value transfer service invitation into a radio wave by using the signal transceiver, and broadcast the radio wave bearing the numeric value transfer service invitation to the surroundings. The broadcast signal broadcast by the service terminal carries a physical address identifier of the service terminal, which may be a physical address identifier of the signal transceiver on the service terminal. The physical address identifier is used to enable the user terminal to establish a connection to the service terminal according to the physical address identifier after the user terminal detects the broadcast signal carrying the numeric value transfer service invitation. The service terminal may display a to-be-transferred amount, so as to display, to a user of the user terminal, a specific numeric value that needs to be transferred.

Step 204: Receive numeric value transfer service data that is sent by the user terminal after the user terminal detects the broadcast signal carrying the numeric value transfer service invitation and establishes a connection, where the numeric value transfer service data includes a first numeric value account identifier and/or a user identifier.

A physical distance between the user terminal and the service terminal is within a preset distance threshold, where the preset distance threshold is a maximum physical distance that enables the user terminal to detect the broadcast signal of the service terminal and establish a stable wireless connection to the service terminal. The user may input an instruction for starting detection of the broadcast signal to the user terminal, so that the user terminal starts detecting whether the broadcast signal broadcast by the service terminal and carrying the numeric value transfer service invitation exists. Specifically, the user terminal may display a trigger button, and after the user terminal detects a click operation of the user on the trigger button, the user terminal starts detecting whether the broadcast signal broadcast by the service terminal and carrying the numeric value transfer service invitation exists.

After detecting the broadcast signal broadcast by the service terminal and carrying the numeric value transfer service invitation, the user terminal may automatically establish a connection to the service terminal; or the user terminal may display information relevant to the broadcast signal, and receive a selection instruction of the user for the relevant information, so as to select the broadcast signal carrying the numeric value transfer service invitation, thereby establishing a connection to the service terminal.

The numeric value transfer service data is used for indicating information about authorization of the user for a current numeric value transfer service, where the numeric value transfer service data includes a first numeric value account identifier and/or a user identifier. A first numeric value account is an account from which a numeric value needs to be transferred, and the first numeric value account identifier is a unique identifier of the first numeric value account.

The first numeric value account identifier may be an account number of the first numeric value account, and is preferably a preset character string (for example, a sequence number) pre-generated according to account information of the first numeric value account. The preset character string is saved in the user terminal and is read when needed. At the same time, a mapping between the preset character string and the first numeric value account is stored in the service server. Using the preset character string to identify the first numeric value account can prevent sensitive information leakage in a transmission process, so as to improve security of the first numeric value account. The account information of the first numeric value account may include but is not limited to at least one of the account number of the first numeric value account, identity information of an account owner, and a numeric value transfer password.

The user identifier is used for uniquely identifying a user identity and may be formed by characters. A mapping between the user identifier and the first numeric value account may be stored in the service server, so that the service server can uniquely determine the first numeric value account according to the user identifier. In an embodiment, the numeric value transfer service data sent by the user terminal to the service terminal needs to include the first numeric value account identifier and the user identifier at the same time, so that the service server authenticates the first numeric value account identifier and the user identifier at the same time, which can make processing of the numeric value transfer service more secure.

Step 206: Send the numeric value transfer service data, the to-be-transferred amount, and a numeric value receiver identifier to the service server, so that the service server performs authentication according to the numeric value transfer service data, and after the authentication succeeds, subtracts the to-be-transferred amount from the first numeric value account corresponding to the first numeric value account identifier and/or the user identifier and adds the to-be-transferred amount to a second numeric value account corresponding to the numeric value receiver identifier.

The service terminal sends the numeric value transfer service data sent from the user terminal along with the to-be-transferred amount and a numeric value receiver identifier that are locally stored in the service terminal to the service server. The numeric value receiver identifier is a unique identifier of a specified acceptor of the numeric value transfer service. The receiver identifier may be a user account obtained by registration, or may be an application identifier of an application currently running on the service terminal to perform the service data processing method in this embodiment, or may be a second numeric value account identifier of a second numeric value account used for receiving the to-be-transferred amount.

After receiving the numeric value transfer service data, the to-be-transferred amount, and the numeric value receiver identifier that are sent from the service terminal, the service server may first authenticate the numeric value transfer service data, for example, may determine whether the user identifier or the first numeric value account identifier exists in a numeric value transfer authorization list, or may determine whether the user identifier and the first numeric value account identifier exist in a numeric value transfer authorization list at the same time and a mapping exits between the two; and if a determining result is yes, it means that the authentication succeeds. When authenticating the numeric value transfer service data, the service server may authenticate a part or all of data included in the numeric value transfer service data.

The first numeric value account may be stored in the service server, or may be stored in another server different from the service server, for example, a bank server. The first numeric value account may be stored in the service server, or may be stored in another server different from the service server, for example, a bank server.

In an embodiment, after the authentication succeeds, the service server may send a numeric value transfer request to a bank server by using the first numeric value account identifier and/or the user identifier and a numeric value transfer password corresponding to the first numeric value account identifier and/or the user identifier, so that the bank server subtracts the foregoing to-be-transferred amount from the first numeric value account corresponding to at least one of the first numeric value account identifier and the user identifier and adds the foregoing to-be-transferred amount to the second numeric value account corresponding to the numeric value receiver identifier, so as to complete the numeric value transfer service.

According to the foregoing service data processing method, when a user terminal needs to transfer a numeric value, a service terminal broadcasts a broadcast signal carrying a numeric value transfer service invitation, and the user terminal establishes a connection to the service terminal according to the numeric value transfer service invitation. Further, the service terminal receives numeric value transfer service data sent from the user terminal and essential to an operation for a numeric value transfer service, and then sends the numeric value transfer service data, a to-be-transferred amount, and a numeric value receiver identifier together to a service server, so that the service server authenticates the numeric value transfer service data and performs an operation of numeric value transfer after the authentication succeeds.

In this way, the user terminal does not need to be connected to the Internet, and can perform the operation for the numeric value transfer service in an offline state by using the service terminal in an online state. Besides, before performing the operation of numeric value transfer, the service server first authenticates the numeric value transfer service data and performs the operation of numeric value transfer only after the authentication succeeds, which ensures security of the operation for the numeric value transfer service. It may be understood that the offline state described in this embodiment refers to that the user terminal may be in a logic state in which the user terminal is not connected to the Internet, rather than that the user terminal must not be connected to the Internet or provided with a condition for connecting the Internet.

In an embodiment, in step 204, the step of receiving numeric value transfer service data that is sent by the user terminal after the user terminal detects the broadcast signal carrying the numeric value transfer service invitation and establishes a connection specifically includes: after the user terminal determines that a broadcast signal with the greatest signal strength among multiple detected broadcast signals is the broadcast signal carrying the numeric value transfer service invitation, receiving the numeric value transfer service data that is sent by the user terminal after the user terminal establishes the connection according to the numeric value transfer service invitation.

Multiple broadcast signals may exist in surroundings of the user terminal, for example, multiple service terminals broadcast signals carrying numeric value transfer service invitations or broadcast signals of other types. In this case, the broadcast signal required by the user to perform the operation for the numeric value transfer service needs to be identified among a great number of broadcast signals.

When the user terminal detects multiple broadcast signals, the user terminal acquires signal strength of each detected broadcast signal, and determines that a broadcast signal with the greatest signal strength is the signal broadcast by the service terminal of the numeric value receiver and carrying the numeric value transfer service invitation. Because a negative correlation exists between signal strength of a broadcast signal detected by the user terminal and a physical distance between the user terminal and the service terminal, the user may put the user terminal close to the service terminal during actual use, thereby selecting the service terminal according to the will of the user.

After determining the broadcast signal, the user terminal establishes the connection to the foregoing service terminal according to the numeric value transfer service invitation carried in the broadcast signal; then the user terminal sends the numeric value transfer service data to the service terminal, and the service terminal receives the numeric value transfer service data sent by the user terminal.

In this embodiment, a manner for correctly determining the acceptor of the numeric value transfer service when multiple broadcast signals exist in the surroundings of the user terminal is provided, and the user can correctly select the acceptor of the numeric value transfer service according to the will of the user by putting the user terminal close to the service terminal, which can ensure secure and correct implementation of the numeric value transfer service.

In an embodiment, in step 204, the step of receiving numeric value transfer service data that is sent by the user terminal after the user terminal detects the broadcast signal carrying the numeric value transfer service invitation and establishes a connection specifically includes: after the user terminal determines that a broadcast signal corresponding to the smallest physical distance value among physical distance values obtained by calculation according to signal strength of multiple detected broadcast signals is the broadcast signal carrying the numeric value transfer service invitation, receiving the numeric value transfer service data that is sent by the user terminal after the user terminal establishes the connection according to the numeric value transfer service invitation.

When the user terminal detects multiple broadcast signals, the user terminal acquires signal strength of each detected broadcast signal, and calculates a physical distance value corresponding to each broadcast signal according to the signal strength of each broadcast signal and a preset mapping between signal strength and a physical distance value, where the physical distance value reflects an actual physical distance between the user terminal and the service terminal. After the user terminal determines that a broadcast signal corresponding to the smallest physical distance value among the physical distance values obtained by calculation is the broadcast signal carrying the numeric value transfer service invitation, the service terminal receives the numeric value transfer service data that is sent by the user terminal after the user terminal establishes the connection according to the numeric value transfer service invitation.

In this embodiment, another manner for correctly determining the acceptor of the numeric value transfer service when multiple broadcast signals exist in the surroundings of the user terminal is provided, and the user can correctly select the acceptor of the numeric value transfer service according to the will of the user by putting the user terminal close to the service terminal, which can ensure secure and correct implementation of the numeric value transfer service.

In an embodiment, the service data processing method further includes: receiving a character sequence, which is obtained by the user terminal by mapping the numeric value transfer service data and the numeric value transfer password together and sent by the user terminal, and sending the character sequence to the service server, where the character sequence is used to enable the service server to acquire the numeric value transfer password corresponding to the first numeric value account identifier and/or the user identifier and authenticate the numeric value transfer service data according to the character sequence and the acquired numeric value transfer password.

The numeric value transfer password is stored in the user terminal in a manner of corresponding to the first numeric value account identifier and/or the user identifier. The service terminal does not store the numeric value transfer password. The service server may acquire the numeric value transfer password corresponding to the first numeric value account identifier and/or the user identifier when the numeric value transfer password is needed, and may store, in a manner of corresponding to the first numeric value account identifier and/or the user identifier, the numeric value transfer password in the service server or another server that can be accessed by the service server.

After establishing the connection to the service terminal, the user terminal may first map the numeric value transfer service data and the numeric value transfer password together as a whole, to obtain a corresponding character sequence. Specifically, the user terminal may map the numeric value transfer service data and the numeric value transfer password together by using a Message Digest Algorithm 5 (MD5) algorithm, to obtain a character sequence.

After obtaining the character sequence, the user terminal may send the encrypted numeric value transfer service data and character sequence together to the service terminal, and then the service terminal may encrypt the numeric value transfer service data, the character sequence, the to-be-transferred amount, and the numeric value receiver identifier, and send the encrypted numeric value transfer service data, character sequence, to-be-transferred amount, and numeric value receiver identifier together to the service server.

After receiving the data sent from the service terminal, the service server acquires the numeric value transfer password corresponding to the first numeric value account identifier and/or the user identifier from the service server or another server, and authenticates the numeric value transfer service data according to the character sequence and the acquired numeric value transfer password. After the authentication succeeds, the service server subtracts the to-be-transferred amount from the first numeric value account corresponding to the first numeric value account identifier and/or the user identifier and adds the to-be-transferred amount to the second numeric value account corresponding to the numeric value receiver identifier.

In this embodiment, the character sequence obtained by mapping the numeric value transfer password and the numeric value transfer service data together is used as an authentication means. Because the numeric value transfer password is neither sent to the service server nor transmitted in the Internet, the possibility of leakage of the numeric value transfer password is low. However, when authenticating the numeric value transfer service data, the service server needs to use the numeric value transfer password; in this way, it is difficult for a malicious user to be successfully authenticated by the service server by using forged numeric value transfer service data and a forged password, which effectively improves security of service data processing.

In an embodiment, information carried in the broadcast signal broadcast by the service server is encrypted, so as to ensure that the broadcast information is not maliciously acquired by a malicious user. In an embodiment, data sent by the user terminal to the service terminal is encrypted, data sent by the service terminal to the service server is also encrypted, and different encryption algorithms may be used during the two encryption processes. Accordingly, after decrypting the numeric value transfer service data, the service server performs authentication according to the decrypted numeric value transfer service data; and after the authentication succeeds, the service server subtracts the to-be-transferred amount from the first numeric value account corresponding to the first numeric value account identifier and/or the user identifier and adds the to-be-transferred amount to the second numeric value account corresponding to the numeric value receiver identifier. In this way, leakage of the data sent by the user terminal and the service terminal can be prevented, which can ensure security of the entire service data processing process.

In an embodiment, step 202 specifically includes: broadcasting the broadcast signal carrying the numeric value transfer service invitation and additional information, where the additional information includes at least one of the to-be-transferred amount, numeric value receiver identity information, terminal information of the terminal broadcasting the broadcast signal carrying the numeric value transfer service invitation, and the additional information is used to enable the user terminal to display the additional information and receive a selection instruction for the displayed additional information, so as to select the broadcast signal carrying the numeric value transfer service invitation.

Specifically, the broadcast signal broadcast by the service terminal carries the numeric value transfer service invitation and the additional information at the same time. The additional information includes but is not limited to at least one of the to-be-transferred amount, the numeric value receiver identity information, and the terminal information of the service terminal. The terminal broadcasting the broadcast signal carrying the numeric value transfer service invitation refers to the service terminal. The terminal information of the service terminal includes a terminal serial number and/or a terminal name and the like, and the numeric value receiver identity information may be, for example, manufacturer information.

After detecting the broadcast signal broadcast by the service terminal, the user terminal acquires and displays the additional information carried in the broadcast signal, where the additional information belongs to the foregoing information relevant to the broadcast signal. When multiple broadcast signals carrying numeric value transfer service invitations and additional information exist, the user terminal displays a list of additional information. The user terminal receives a selection instruction for the displayed additional information, so as to select a piece of additional information, and then accordingly selects a broadcast signal carrying a numeric value transfer service invitation. The broadcast signal is a broadcast signal according to which a user performs an operation for a numeric value transfer service.

In an embodiment, the connection established between the user terminal and the service terminal is a Bluetooth connection or an NFC connection. The connection is preferably a Bluetooth connection. Compared with an NFC technology, a Bluetooth technology has a larger effective range, so that the user terminal does not need to be very close to the service terminal, which improves convenience during the operation.

In an embodiment, the numeric value transfer service data further includes at least one of a time stamp, terminal information of the user terminal, and a randomly generated number.

Specifically, the time stamp may be a system time or a time of a clock server obtained by the user terminal in real time, and is used for indicating a specific time at which the user terminal authorizes the operation for the numeric value transfer service. When performing authentication according to the numeric value transfer service data, the service server may authenticate the time stamp by determining whether a difference between a current time and the time stamp is within a preset time threshold; and if the difference is within the preset time threshold, it means that the authentication of the time stamp succeeds. In this way, the authentication is more effective, and the implementation of the numeric value transfer service is more secure.

The terminal information of the user terminal may include at least one of a type of the user terminal, a terminal name, a terminal identifier, and the like. The service server may authenticate the terminal information of the user terminal by determining whether the terminal information of the user is in a list of trustable terminals; and if the terminal information exists in the list of trustable terminals, it means that the authentication of the terminal information of the user terminal succeeds.

The user terminal randomly generates a random number, and adds the random number to the numeric value transfer service data sent to the service terminal, which can increase changes of the numeric value transfer service data. In this way, even for a same user, because of existence of random numbers, service data generated each time is different, and therefore character sequences obtained by mapping the numeric value transfer service data and the numeric value transfer password together are various, which prevents a malicious user from decoding content in the numeric value transfer service data by means of exhaustive attack.

In an embodiment, step 206 specifically includes: sending the numeric value transfer service data, the to-be-transferred amount, and the numeric value receiver identifier to the service server, so that the service server performs authentication according to the numeric value transfer service data, sends confirmation request information to the user terminal after the authentication succeeds, and after a confirmation instruction sent by the user terminal in response to the confirmation request information is received, subtracts the to-be-transferred amount from the first numeric value account corresponding to the first numeric value account identifier and/or the user identifier and adds the to-be-transferred amount to the second numeric value account corresponding to the numeric value receiver identifier.

In this embodiment, before performing the operation of numeric value transfer after the authentication succeeds, the service server sends confirmation request information to the user terminal, and the user operates the user to make confirmation, so that the user terminal sends a confirmation instruction to the service server in response to the confirmation request information. Then the service server subtracts the to-be-transferred amount from the first numeric value account corresponding to the first numeric value account identifier and/or the user identifier and adds the to-be-transferred amount to the second numeric value account corresponding to the numeric value receiver identifier according to the confirmation instruction. In this way, security of the operation for the numeric value transfer service can be improved.

The service server may send the confirmation request information to the user terminal by using a short message service message or a service terminal relay, or may send the confirmation request information to the user terminal by using the Internet (such as an e-mail or an instant message). Accordingly, the user terminal may send the confirmation instruction to the service server in response to the foregoing confirmation request information by using a short message service message, a service terminal relay, and the Internet (such as an e-mail or an instant message).

In an embodiment, after subtracting the to-be-transferred amount from the first numeric value account corresponding to the first numeric value account identifier and/or the user identifier and adding the to-be-transferred amount to the second numeric value account corresponding to the numeric value receiver identifier, the service server may return, to the service terminal, result information indicating that the numeric value transfer succeeds. When the authentication by the service server fails, the service server may return, to the service terminal, result information indicating that the numeric value transfer fails.

Figure 3:
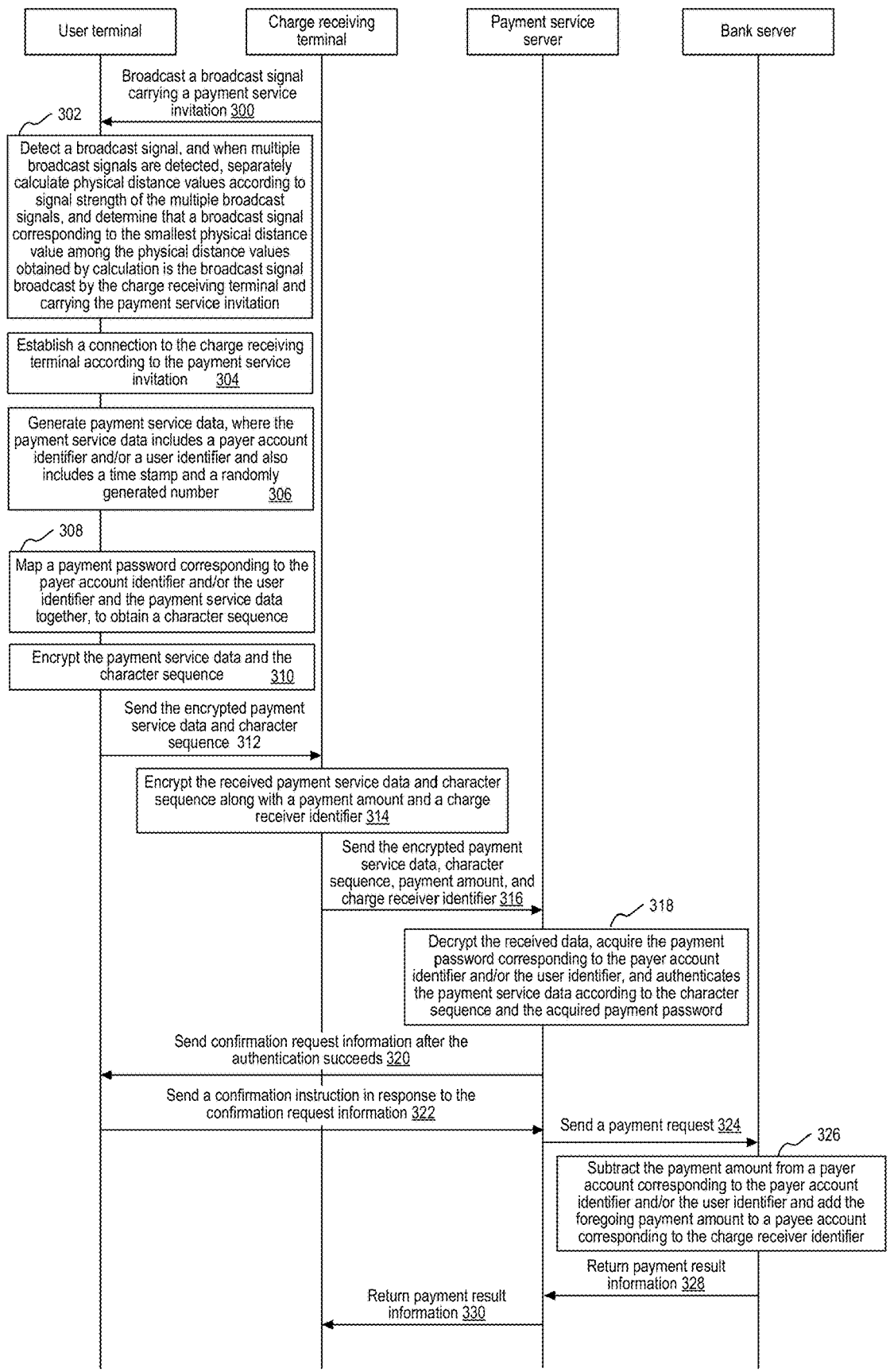
FIG. 3 is a schematic flowchart of a service data processing method based on a payment service in a specific application scenario.

A principle of the foregoing service data processing method is described in the following by using a specific application scenario. In this application scenario, that the numeric value transfer service is a payment service is used as an example for description. In this application scenario, the service terminal is a charge receiving terminal, the service server is a payment service server, the to-be-transferred amount is a payment amount, the first numeric value account is a payer account, the second numeric value account is a payee account, and the numeric value receiver is a charge receiver. As shown in FIG. 3, the following steps are specifically included.

When needing to receive a charge, the charge receiving terminal may display a payment amount or may not display a payment amount, and the charge receiving terminal broadcasts a broadcast signal carrying a payment service invitation. After a user performs an operation on a user terminal to trigger an offline payment function, the user terminal detects a broadcast signal carrying a payment service invitation (300). When detecting multiple broadcast signals, the user terminal separately calculates (302) physical distance values according to signal strength of the multiple broadcast signals, and determines that a broadcast signal corresponding to the smallest physical distance value among the physical distance values obtained by calculation is the broadcast signal broadcast by the charge receiving terminal and carrying the payment service invitation. Certainly, the broadcast signal broadcast by the charge receiving terminal and carrying the payment service invitation may also be determined by using another manner in the foregoing embodiment.

The user terminal establishes (304) a connection to the charge receiving terminal according to the payment service invitation, and generates (306) payment service data, where the payment service data includes a payer account identifier and/or a user identifier and also includes a time stamp and a randomly generated number. The service terminal maps (308) a payment password corresponding to the payer account identifier and/or the user identifier and the payment service data together, to obtain a character sequence, encrypts (310) the payment service data and the character sequence, and then sends (312) the encrypted payment service data and character sequence to the charge receiving terminal.

The charge receiving terminal encrypts (314) the received payment service data and character sequence along with the payment amount and a charge receiver identifier, and sends (316) the encrypted payment service data, character sequence, payment amount, and charge receiver identifier to the payment service server.

After decrypting (318) the data of the received encrypted payment service data, character sequence, payment amount, and charge receiver identifier, the payment service server acquires the payment password corresponding to the payer account identifier and/or the user identifier, and authenticates the payment service data according to the character sequence and the acquired payment password.

After the authentication succeeds, the payment service server sends (320) confirmation request information to the user terminal, and sends (324) a payment request to a bank server after receiving a confirmation instruction returned by the user terminal in response to the confirmation request information. Certainly, the payment service server may also directly send a payment request to a bank server after the authentication succeeds. The payment request carries information such as payer account information, payee account information, and the payment amount. The bank terminal subtracts (326) the payment amount from the payer account corresponding to the payer account identifier and/or the user identifier and adds the foregoing payment amount to the payee account corresponding to the charge receiver identifier according to the payment request. After the payment succeeds or fails, the bank server may return (328), to the payment service server, payment result information indicating that the payment succeeds or fails, and the payment service server may then return (330) the payment result information to the charge receiving terminal.

Certainly, the payer account and the payee account may be set in the payment service server. In this way, the bank server is not needed, and after the authentication succeeds, the payment service server directly subtracts the payment amount from the payer account corresponding to the payer account identifier and/or the user identifier and adds the foregoing payment amount to the payee account corresponding to the charge receiver identifier. After payment succeeds or fails, the payment service server may return, to the charge receiving terminal, payment result information indicating that the payment succeeds or fails.

Figure 4:
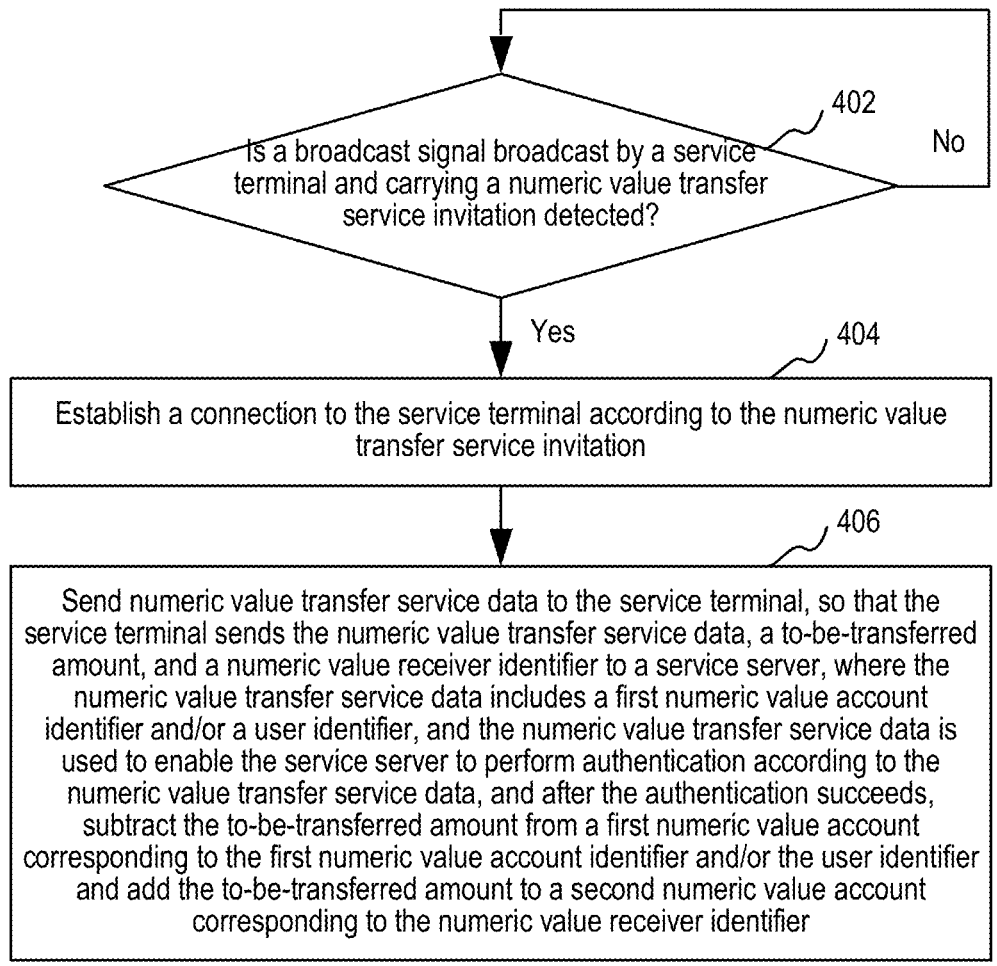
FIG. 4 is a schematic flowchart of a service data processing method according to another embodiment.

In an embodiment, a service data processing method is provided. In this embodiment, that this method is applied to a user terminal is used as an example for description, where the user terminal may be included in the service data processing system shown in FIG. 1. As shown in FIG. 4, the method specifically includes the following steps:

Step 402: Detect a broadcast signal, to determine whether a broadcast signal broadcast by a service terminal and carrying a numeric value transfer service invitation is detected. If the broadcast signal is detected, step 404 is performed; or if the broadcast signal is not detected, step 404 is still performed or the process is ended.

The service terminal may first display a to-be-transferred amount, so as to display, to a user of the user terminal, a specific numeric value that needs to be transferred. The service terminal broadcasts, by using the signal transceiver, a radio broadcast signal carrying a numeric value transfer service invitation. The signal transceiver may be a signal transceiver based on Bluetooth, or may be a signal transceiver based on NFC. The signal broadcast by using the signal transceiver may be a Bluetooth signal, an NFC signal, or a sound wave signal.

The numeric value transfer service invitation may be indicated by using a pre-agreed service identifier, where the service identifier may be a UUID. When the user terminal detects that a broadcast signal carries the service identifier, it means that the broadcast signal carries the numeric value transfer service invitation. The service terminal may convert the numeric value transfer service invitation into a radio wave by using the signal transceiver, and broadcast the radio wave bearing the numeric value transfer service invitation to the surroundings.

A physical distance between the user terminal and the service terminal is within a preset distance threshold, where the preset distance threshold is a maximum physical distance that enables the user terminal to detect the broadcast signal of the service terminal and establish a stable wireless connection to the service terminal. The user may input an instruction for starting detection of the broadcast signal to the user terminal, so that the user terminal starts detecting whether the broadcast signal broadcast by the service terminal and carrying the numeric value transfer service invitation exists. Specifically, the user terminal may display a trigger button, and after the user terminal detects a click operation of the user on the trigger button, the user terminal starts detecting whether the broadcast signal broadcast by the service terminal and carrying the numeric value transfer service invitation exists.

Step 404: Establish a connection to the service terminal according to the numeric value transfer service invitation.

After detecting the broadcast signal broadcast by the service terminal and carrying the numeric value transfer service invitation, the user terminal may automatically establish a connection to the service terminal; or the user terminal may display information relevant to the broadcast signal, and receive a selection instruction of the user for the relevant information, so as to select the broadcast signal carrying the numeric value transfer service invitation, thereby establishing a connection to the service terminal.

Step 406: Send numeric value transfer service data to the service terminal, so that the service terminal sends the numeric value transfer service data, a to-be-transferred amount, and a numeric value receiver identifier to a service server, where the numeric value transfer service data includes a first numeric value account identifier and/or a user identifier, and the numeric value transfer service data is used to enable the service server to perform authentication according to the numeric value transfer service data, and after the authentication succeeds, subtract the to-be-transferred amount from a first numeric value account corresponding to the first numeric value account identifier and/or the user identifier and add the to-be-transferred amount to a second numeric value account corresponding to the numeric value receiver identifier.

The numeric value transfer service data is used for indicating information about authorization of the user for a current numeric value transfer service, where the numeric value transfer service data includes a first numeric value account identifier and/or a user identifier. The first numeric value account is an account from which a numeric value needs to be transferred, and the first numeric value account identifier is a unique identifier of the first numeric value account.

The first numeric value account identifier may be an account number of the first numeric value account, and is preferably a preset character string pre-generated according to account information of the first numeric value account. The preset character string is saved in the user terminal and is read when needed. At the same time, a mapping between the preset character string and the first numeric value account is stored in the service server. Using the preset character string to identify the first numeric value account can prevent sensitive information leakage in a transmission process, so as to improve security of the first numeric value account. The account information of the first numeric value account may include but is not limited to at least one of the account number of the first numeric value account, identity information of an account owner, and a numeric value transfer password.

The user identifier is used for uniquely identifying a user identity and may be formed by characters. A mapping between the user identifier and the first numeric value account may be stored in the service server, so that the service server can uniquely determine the first numeric value account according to the user identifier. In an embodiment, the numeric value transfer service data sent by the user terminal to the service terminal needs to include the first numeric value account identifier and the user identifier at the same time, so that the service server authenticates the first numeric value account identifier and the user identifier at the same time, which can make processing of the numeric value transfer service more secure.

The user terminal sends the numeric value transfer service data to the service terminal, and the service terminal sends the numeric value transfer service data sent from the user terminal along with the to-be-transferred amount and a numeric value receiver identifier that are locally stored in the service terminal to the service server. The numeric value receiver identifier is a unique identifier of a specified acceptor of the numeric value transfer service. The receiver identifier may be a user account obtained by registration, or may be an application identifier of an application currently running on the service terminal to perform a service data processing method corresponding to the service data processing method in this embodiment, or may be a second numeric value account identifier of a second numeric value account used for receiving the to-be-transferred amount.

After receiving the numeric value transfer service data, the to-be-transferred amount, and the numeric value receiver identifier that are sent from the service terminal, the service server may first authenticate the numeric value transfer service data, for example, may determine whether the user identifier or the first numeric value account identifier exists in a numeric value transfer authorization list, or may determine whether the user identifier and the first numeric value account identifier exist in a numeric value transfer authorization list at the same time and a mapping exits between the two; and if a determining result is yes, it means that the authentication succeeds. When authenticating the numeric value transfer service data, the service server may authenticate a part or all of data included in the numeric value transfer service data.

The first numeric value account may be stored in the service server, or may be stored in another server different from the service server, for example, a bank server. The first numeric value account may be stored in the service server, or may be stored in another server different from the service server, for example, a bank server.

In an embodiment, after the authentication succeeds, the service server may send a numeric value transfer request to a bank server by using the first numeric value account identifier and/or the user identifier and a numeric value transfer password corresponding to the first numeric value account identifier and/or the user identifier, so that the bank server subtracts the foregoing to-be-transferred amount from the first numeric value account corresponding to at least one of the first numeric value account identifier and the user identifier and adds the foregoing to-be-transferred amount to the second numeric value account corresponding to the numeric value receiver identifier, so as to complete the numeric value transfer service.

According to the foregoing service data processing method, when a service terminal requires a user to perform an operation for a numeric value transfer service, the service terminal broadcasts a broadcast signal carrying a numeric value transfer service invitation. When the broadcast signal is detected, a connection to the service terminal is established according to the numeric value transfer service invitation. Further, numeric value transfer service data is sent to the service terminal by using the established connection, so that the service terminal sends the numeric value transfer service data, the to-be-transferred amount, and a numeric value receiver identifier together to a service server, so that the service server authenticates the numeric value transfer service data and performs an operation of numeric value transfer after the authentication succeeds.

In this way, no connection to the Internet is required, and the operation for the numeric value transfer service can be performed in an offline state by using the online service terminal. Besides, before performing the operation of numeric value transfer, the service server first authenticates the numeric value transfer service data and performs the operation of numeric value transfer only after the authentication succeeds, which ensures security of the operation for the numeric value transfer service.

In an embodiment, the step of establishing a connection to the service terminal according to the numeric value transfer service invitation when the broadcast signal broadcast by the service terminal and carrying the numeric value transfer service invitation is detected includes: when multiple broadcast signals are detected, determining that a broadcast signal with the greatest signal strength among the multiple broadcast signals is the broadcast signal carrying the numeric value transfer service invitation, and establishing the connection to the service terminal according to the numeric value transfer service invitation.

Multiple broadcast signals may exist in surroundings of the user terminal, for example, multiple service terminals broadcast signals carrying numeric value transfer service invitations or broadcast signals of other types. In this case, the broadcast signal required by the user to perform the operation for the numeric value transfer service needs to be identified among a great number of broadcast signals.

When the user terminal detects multiple broadcast signals, the user terminal acquires signal strength of each detected broadcast signal, and determines that a broadcast signal with the greatest signal strength is the broadcast signal broadcast by the service terminal of the numeric value receiver and carrying the numeric value transfer service invitation. Because a negative correlation exists between signal strength of a broadcast signal detected by the user terminal and a physical distance between the user terminal and the service terminal, the user may put the user terminal close to the service terminal during actual use, thereby selecting the service terminal according to the will of the user.

After determining the broadcast signal, the user terminal establishes the connection to the foregoing service terminal according to the numeric value transfer service invitation carried in the broadcast signal; then the user terminal sends the numeric value transfer service data to the service terminal, and the service terminal receives the numeric value transfer service data sent by the user terminal.

In this embodiment, a manner for correctly determining the acceptor of the numeric value transfer service when multiple broadcast signals exist in the surroundings of the user terminal is provided, and the user can correctly select the acceptor of the numeric value transfer service according to the will of the user by putting the user terminal close to the service terminal, which can ensure secure and correct implementation of the numeric value transfer service.

In an embodiment, the step of establishing a connection to the service terminal according to the numeric value transfer service invitation when the broadcast signal broadcast by the service terminal and carrying the numeric value transfer service invitation is detected includes: when multiple broadcast signals are detected, calculating physical distance values according to signal strength of the multiple broadcast signals, determining that a broadcast signal corresponding to the smallest physical distance value among the physical distance values obtained by calculation is the broadcast signal carrying the numeric value transfer service invitation, and establishing the connection to the service terminal according to the numeric value transfer service invitation.

When the user terminal detects multiple broadcast signals, the user terminal acquires signal strength of each detected broadcast signal, and calculates a physical distance value corresponding to each broadcast signal according to the signal strength of each broadcast signal and a preset mapping between signal strength and a physical distance value, where the physical distance value reflects an actual physical distance between the user terminal and the service terminal. After the user terminal determines that a broadcast signal corresponding to the smallest physical distance value among the physical distance values obtained by calculation is the broadcast signal carrying the numeric value transfer service invitation, the service terminal receives the numeric value transfer service data that is sent by the user terminal after the user terminal establishes the connection according to the numeric value transfer service invitation.

In this embodiment, another manner for correctly determining the acceptor of the numeric value transfer service when multiple broadcast signals exist in the surroundings of the user terminal is provided, and the user can correctly select the acceptor of the numeric value transfer service according to the will of the user by putting the user terminal close to the service terminal, which can ensure secure and correct implementation of the numeric value transfer service.

In an embodiment, the service data processing method further includes: mapping the numeric value transfer service data and the numeric value transfer password together, to obtain a character sequence, and sending the character sequence to the service terminal, so that the service terminal sends the character sequence to the service server, where the character sequence is used to enable the service server to acquire the numeric value transfer password corresponding to the first numeric value account identifier and/or the user identifier and authenticate the numeric value transfer service data according to the character sequence and the acquired numeric value transfer password.

The numeric value transfer password is stored in the user terminal in a manner of corresponding to the first numeric value account identifier and/or the user identifier. The service terminal does not store the numeric value transfer password. The service server may acquire the numeric value transfer password corresponding to the first numeric value account identifier and/or the user identifier when the numeric value transfer password is needed, and may store, in a manner of corresponding to the first numeric value account identifier and/or the user identifier, the numeric value transfer password in the service server or another server that can be accessed by the service server.

After establishing the connection to the service terminal, the user terminal may first map the numeric value transfer service data and the numeric value transfer password together as a whole, to obtain a corresponding character sequence. Specifically, the user terminal may map the numeric value transfer service data and the numeric value transfer password together by using an MD5 algorithm, to obtain a character sequence.

After obtaining the character sequence, the user terminal may send the numeric value transfer service data and the character sequence together to the service terminal, and then the service terminal may encrypt the numeric value transfer service data, the character sequence, the to-be-transferred amount, and the numeric value receiver identifier, and send the encrypted numeric value transfer service data, character sequence, to-be-transferred amount, and numeric value receiver identifier together to the service server.

After receiving the data sent from the service terminal, the service server acquires the numeric value transfer password corresponding to the first numeric value account identifier and/or the user identifier from the service server or another server, and authenticates the numeric value transfer service data according to the character sequence and the acquired numeric value transfer password. After the authentication succeeds, the service server subtracts the to-be-transferred amount from the first numeric value account corresponding to the first numeric value account identifier and/or the user identifier and adds the to-be-transferred amount to the second numeric value account corresponding to the numeric value receiver identifier.

In this embodiment, the character sequence obtained by mapping the numeric value transfer password and the numeric value transfer service data together is used as an authentication means. Because the numeric value transfer password is neither sent to the service server nor transmitted in the Internet, the possibility of leakage of the numeric value transfer password is low. However, when performing authentication according to the numeric value transfer service data, the service server needs to use the numeric value transfer password; in this way, it is difficult for a malicious user to be successfully authenticated by the service server by using forged numeric value transfer service data and a forged password, which effectively improves security of service data processing.

In an embodiment, information carried in the broadcast signal broadcast by the service server is encrypted, so as to ensure that the broadcast information is not maliciously acquired by a malicious user. In an embodiment, data sent by the user terminal to the service terminal is encrypted, data sent by the service terminal to the service server is also encrypted, and different encryption algorithms may be used during the two encryption processes. Accordingly, after decrypting the numeric value transfer service data, the service server performs authentication according to the decrypted numeric value transfer service data; and after the authentication succeeds, the service server subtracts the to-be-transferred amount from the first numeric value account corresponding to the first numeric value account identifier and/or the user identifier and adds the to-be-transferred amount to the second numeric value account corresponding to the numeric value receiver identifier. In this way, leakage of the data sent by the user terminal and the service terminal can be prevented, which can ensure security of the entire service data processing process.

In an embodiment, the detected broadcast signal carrying the numeric value transfer service invitation also carries additional information, where the additional information includes at least one of the to-be-transferred amount, numeric value receiver identity information, and terminal information of the service terminal; and the service data processing method further includes: displaying the additional information; receiving a selection instruction for the displayed additional information; and selecting, according to the selection instruction, the broadcast signal carrying the numeric value transfer service invitation.

Specifically, the broadcast signal broadcast by the service terminal carries the numeric value transfer service invitation and the additional information at the same time. The additional information includes but is not limited to at least one of the to-be-transferred amount, the numeric value receiver identity information, and the terminal information of the service terminal. The terminal broadcasting the broadcast signal carrying the numeric value transfer service invitation refers to the service terminal. The terminal information of the service terminal includes a terminal serial number and/or a terminal name and the like, and the numeric value receiver identity information may be, for example, manufacturer information.

After detecting the broadcast signal broadcast by the service terminal, the user terminal acquires and displays the additional information carried in the broadcast signal, where the additional information belongs to the foregoing information relevant to the broadcast signal. When multiple broadcast signals carrying numeric value transfer service invitations and additional information exist, the user terminal displays a list of additional information. The user terminal receives a selection instruction for the displayed additional information, so as to select a piece of additional information, and then accordingly selects a broadcast signal carrying a numeric value transfer service invitation. The broadcast signal is a broadcast signal according to which a user performs an operation for a numeric value transfer service.

In an embodiment, the connection established between the user terminal and the service terminal is a Bluetooth connection or an NFC connection. The connection is preferably a Bluetooth connection. Compared with an NFC technology, a Bluetooth technology has a larger effective range, so that the user terminal does not need to be very close to the service terminal, which improves convenience during the operation.

In an embodiment, the numeric value transfer service data further includes at least one of a time stamp, terminal information of the user terminal, and a randomly generated number.

Specifically, the time stamp may be a system time or a time of a clock server obtained by the user terminal in real time, and is used for indicating a specific time at which the user terminal authorizes the operation for the numeric value transfer service. When performing authentication according to the numeric value transfer service data, the service server may authenticate the time stamp by determining whether a difference between a current time and the time stamp is within a preset time threshold; and if the difference is within the preset time threshold, it means that the authentication of the time stamp succeeds. In this way, the authentication is more effective, and the implementation of the numeric value transfer service is more secure.

The terminal information of the user terminal may include at least one of a type of the user terminal, a terminal name, a terminal identifier, and the like. The service server may authenticate the terminal information of the user terminal by determining whether the terminal information of the user is in a list of trustable terminals; and if the terminal information exists in the list of trustable terminals, it means that the authentication of the terminal information of the user terminal succeeds.

The user terminal randomly generates a random number, and adds the random number to the numeric value transfer service data sent to the service terminal, which can increase changes of the numeric value transfer service data. In this way, even for a same user, because of existence of random numbers, service data generated each time is different, and therefore character sequences obtained by mapping the numeric value transfer service data and the numeric value transfer password together are various, which prevents a malicious user from decoding content in the numeric value transfer service data by means of exhaustive attack.

In an embodiment, the numeric value transfer service data is further used to enable the service server to perform authentication according to the numeric value transfer service data, send confirmation request information to the user terminal after the authentication succeeds, and after a confirmation instruction sent by the user terminal in response to the confirmation request information is received, subtract the to-be-transferred amount from the first numeric value account corresponding to the first numeric value account identifier and/or the user identifier and add the to-be-transferred amount to the second numeric value account corresponding to the numeric value receiver identifier.

In this embodiment, before performing the operation of numeric value transfer after the authentication succeeds, the service server sends confirmation request information to the user terminal, and the user operates the user to make confirmation, so that the user terminal sends a confirmation instruction to the service server in response to the confirmation request information. Then the service server subtracts the to-be-transferred amount from the first numeric value account corresponding to the first numeric value account identifier and/or the user identifier and adds the to-be-transferred amount to the second numeric value account corresponding to the numeric value receiver identifier according to the confirmation instruction. In this way, security of the operation for the numeric value transfer service can be improved.

The service server may send the confirmation request information to the user terminal by using a short message service message or a service terminal relay, or may send the confirmation request information to the user terminal by using the Internet (such as an e-mail or an instant message). Accordingly, the user terminal may send the confirmation instruction to the service server in response to the foregoing confirmation request information by using a short message service message, a service terminal relay, and the Internet (such as an e-mail or an instant message).

In an embodiment, after the service server is configured to subtract the to-be-transferred amount from the first numeric value account corresponding to the first numeric value account identifier and/or the user identifier and add the to-be-transferred amount to the second numeric value account corresponding to the numeric value receiver identifier, the service server may be configured to return, to the service terminal, result information indicating that the numeric value transfer succeeds. When the authentication fails, the service server may be configured to return, to the service terminal, result information indicating that the numeric value transfer fails.

Figure 5:
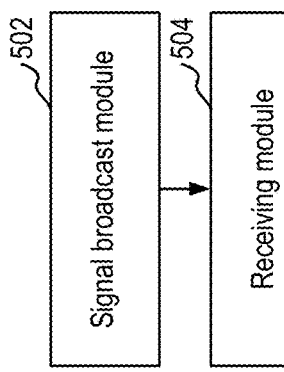
FIG. 5 is a structural block diagram of a service terminal according to an embodiment.

As shown in FIG. 5, in an embodiment, a service terminal is provided, where the service terminal includes: a signal broadcast module 502, a receiving module 504, and a data sending module 506.

The signal broadcast module 502 is configured to broadcast a broadcast signal carrying a numeric value transfer service invitation.

The signal broadcast module 502 may be configured to broadcast, by using the signal transceiver, a radio broadcast signal carrying a numeric value transfer service invitation. The signal transceiver may be a signal transceiver based on Bluetooth, or may be a signal transceiver based on NFC. The signal broadcast by using the signal transceiver may be a Bluetooth signal, an NFC signal, or a sound wave signal.

The numeric value transfer service invitation refers to information for requesting the user terminal to grant authorization to transfer a pre-agreed specific numeric value. The specific numeric value may be, for example, a numeric value of a virtual currency, or may be another transferable numeric value. The numeric value transfer service invitation may be indicated by using a pre-agreed service identifier, where the service identifier may be a UUID. When the user terminal detects that a broadcast signal carries the service identifier, it means that the broadcast signal carries the numeric value transfer service invitation. The signal broadcast module 502 may be configured to convert the numeric value transfer service invitation into a radio wave by using the signal transceiver, and broadcast the radio wave bearing the numeric value transfer service invitation to the surroundings. The service terminal may further include a display module (not shown in the figure), configured to display a to-be-transferred amount, so as to display, to a user of the user terminal, a specific numeric value that needs to be transferred.

The receiving module 504 is configured to receive numeric value transfer service data that is sent by the user terminal after the user terminal detects the broadcast signal carrying the numeric value transfer service invitation and establishes a connection, where the numeric value transfer service data includes a first numeric value account identifier and/or a user identifier.

The user may input an instruction for starting detection of the broadcast signal to the user terminal, so that the user terminal starts detecting whether the broadcast signal broadcast by the service terminal and carrying the numeric value transfer service invitation exists. Specifically, the user terminal may be configured to display a trigger button, and the user terminal is configured to: after detecting a click operation of the user on the trigger button, start detecting whether the broadcast signal broadcast by the service terminal and carrying the numeric value transfer service invitation exists.

After the user terminal detects the broadcast signal broadcast by the service terminal and carrying the numeric value transfer service invitation, the user terminal may be configured to automatically establish a connection to the service terminal; or the user terminal may display information relevant to the broadcast signal, and receive a selection instruction of the user for the relevant information, so as to select the broadcast signal carrying the numeric value transfer service invitation, thereby establishing a connection to the service terminal.

The numeric value transfer service data is used for indicating information about authorization of the user for a current numeric value transfer service, where the numeric value transfer service data includes a first numeric value account identifier and/or a user identifier. The first numeric value account identifier may be an account number of the first numeric value account, and is preferably a preset character string pre-generated according to account information of the first numeric value account. The preset character string is saved in the user terminal and is read when needed. At the same time, a mapping between the preset character string and the first numeric value account is stored in the service server. Using the preset character string to identify the first numeric value account can prevent sensitive information leakage in a transmission process, so as to improve security of the first numeric value account. The account information of the first numeric value account may include but is not limited to at least one of the account number of the first numeric value account, identity information of an account owner, and a numeric value transfer password.

The user identifier is used for uniquely identifying a user identity and may be formed by characters. A mapping between the user identifier and the first numeric value account may be stored in the service server, so that the service server can uniquely determine the first numeric value account according to the user identifier. In an embodiment, the numeric value transfer service data sent by the user terminal to the service terminal needs to include the first numeric value account identifier and the user identifier at the same time, so that the service server authenticates the first numeric value account identifier and the user identifier at the same time, which can make processing of the numeric value transfer service more secure.

The data sending module 506 is configured to send the numeric value transfer service data, the to-be-transferred amount, and a numeric value receiver identifier to the service server, so that the service server performs authentication according to the numeric value transfer service data, and after the authentication succeeds, subtracts the to-be-transferred amount from the first numeric value account corresponding to the first numeric value account identifier and/or the user identifier and adds the to-be-transferred amount to a second numeric value account corresponding to the numeric value receiver identifier.

The data sending module 506 is configured to send, to the service server, the numeric value transfer service data sent from the user terminal along with the to-be-transferred amount and a numeric value receiver identifier that are locally stored. The numeric value receiver identifier is a unique identifier of a specified acceptor of the numeric value transfer service. The receiver identifier may be a user account obtained by registration, or may be an application identifier, or may be a second numeric value account identifier of a second numeric value account used for receiving the to-be-transferred amount.

The service server is configured to receive the numeric value transfer service data, the to-be-transferred amount, and the numeric value receiver identifier that are sent from the service terminal, and is configured to authenticate the numeric value transfer service data, for example, may be configured to determine whether the user identifier or the first numeric value account identifier exists in a numeric value transfer authorization list, or may be configured to determine whether the user identifier and the first numeric value account identifier exist in a numeric value transfer authorization list at the same time and a mapping exits between the two; and if a determining result is yes, it means that the authentication succeeds. The service server is configured to authenticate a part or all of data included in the numeric value transfer service data.

The first numeric value account may be stored in the service server, or may be stored in another server different from the service server, for example, a bank server. The first numeric value account may be stored in the service server, or may be stored in another server different from the service server, for example, a bank server.

In an embodiment, after the authentication succeeds, the service server may be configured to send a numeric value transfer request to a bank server by using the first numeric value account identifier and/or the user identifier and a numeric value transfer password corresponding to the first numeric value account identifier and/or the user identifier, so that the bank server subtracts the foregoing to-be-transferred amount from the first numeric value account corresponding to at least one of the first numeric value account identifier and the user identifier and adds the foregoing to-be-transferred amount to the second numeric value account corresponding to the numeric value receiver identifier, so as to complete the numeric value transfer service.

According to the foregoing service terminal, when a user terminal needs to transfer a numeric value, the service terminal broadcasts a broadcast signal carrying a numeric value transfer service invitation, and the user terminal establishes a connection to the service terminal according to the numeric value transfer service invitation. Further, the service terminal receives numeric value transfer service data sent from the user terminal and essential to an operation for a numeric value transfer service, and then sends the numeric value transfer service data, a to-be-transferred amount, and a numeric value receiver identifier together to a service server, so that the service server authenticates the numeric value transfer service data and performs an operation of numeric value transfer after the authentication succeeds.

In this way, the user terminal does not need to be connected to the Internet, and can perform the operation for the numeric value transfer service in an offline state by using the service terminal in an online state. Besides, before performing the operation of numeric value transfer, the service server first authenticates the numeric value transfer service data and performs the operation of numeric value transfer only after the authentication succeeds, which ensures security of the operation for the numeric value transfer service.

In an embodiment, the receiving module 504 is configured to receive encrypted numeric value transfer service data that is sent by the user terminal after the user terminal detects the broadcast signal carrying the numeric value transfer service invitation and establishes the connection, so that the numeric value transfer service data according to which the service server performs authentication is decrypted before the authentication is performed according to the numeric value transfer service data. Specifically, data sent by the user terminal to the service terminal is encrypted, data sent by the service terminal to the service server is also encrypted, and different encryption algorithms may be used during the two encryption processes. Accordingly, after decrypting the numeric value transfer service data, the service server performs authentication according to the decrypted numeric value transfer service data; and after the authentication succeeds, the service server subtracts the to-be-transferred amount from the first numeric value account corresponding to the first numeric value account identifier and/or the user identifier and adds the to-be-transferred amount to the second numeric value account corresponding to the numeric value receiver identifier. In this way, leakage of the data sent by the user terminal and the service terminal can be prevented, which can ensure security of the entire service data processing process.

In an embodiment, the receiving module 504 is further configured to: after it is determined that a broadcast signal with the greatest signal strength among multiple broadcast signals detected by the user terminal is the broadcast signal carrying the numeric value transfer service invitation, receive the numeric value transfer service data that is sent by the user terminal after the user terminal establishes the connection according to the numeric value transfer service invitation.

In an embodiment, the receiving module 504 is further configured to: after it is determined that a broadcast signal corresponding to the smallest physical distance value among multiple physical distance values that are obtained by calculation by the user terminal according to signal strength of the multiple detected broadcast signals is the broadcast signal carrying the numeric value transfer service invitation, receive the numeric value transfer service data that is sent by the user terminal after the user terminal establishes the connection according to the numeric value transfer service invitation.

In an embodiment, the receiving module 504 is further configured to receive a character sequence, which is obtained by the user terminal by mapping the numeric value transfer service data and the numeric value transfer password together and sent by the user terminal. The data sending module 506 is further configured to send the character sequence to the service server. The character sequence is used to enable the service server to acquire the numeric value transfer password corresponding to the first numeric value account identifier and/or the user identifier and authenticate the numeric value transfer service data according to the character sequence and the acquired numeric value transfer password.

The numeric value transfer password is stored in the user terminal in a manner of corresponding to the first numeric value account identifier and/or the user identifier. The service terminal is not configured to store the numeric value transfer password. The service server may be configured to acquire the numeric value transfer password corresponding to the first numeric value account identifier and/or the user identifier when the numeric value transfer password is needed. After establishing the connection to the service terminal, the user terminal may be configured to first map the numeric value transfer service data and the numeric value transfer password together as a whole, to obtain a corresponding character sequence. Specifically, the user terminal may be configured to map the numeric value transfer service data and the numeric value transfer password together by using an MD5 algorithm, to obtain a character sequence.

The user terminal may be configured to send the numeric value transfer service data and the character sequence together to the service terminal after obtaining the character sequence, the receiving module 504 is configured to receive the data, and the data sending module 506 is configured to encrypt the numeric value transfer service data, the character sequence, the to-be-transferred amount, and the numeric value receiver identifier, and send the encrypted numeric value transfer service data, character sequence, to-be-transferred amount, and numeric value receiver identifier together to the service server.

The character sequence is used to enable the service server to acquire the numeric value transfer password corresponding to the first numeric value account identifier and/or the user identifier from the service server or another server after the service server receives the data sent from the service terminal, and authenticate the numeric value transfer service data according to the character sequence and the acquired numeric value transfer password. After the authentication succeeds, the service server is configured to perform the operation of subtracting the to-be-transferred amount from the first numeric value account corresponding to the first numeric value account identifier and/or the user identifier, and is configured to perform the operation of adding the to-be-transferred amount to the second numeric value account corresponding to the numeric value receiver identifier.

In this embodiment, the character sequence obtained by mapping the numeric value transfer password and the numeric value transfer service data together is used as an authentication means. Because the numeric value transfer password is neither sent to the service server nor transmitted in the Internet, the possibility of leakage of the numeric value transfer password is low. However, when performing authentication according to the numeric value transfer service data, the service server needs to use the numeric value transfer password; in this way, it is difficult for a malicious user to be successfully authenticated by the service server by using forged numeric value transfer service data and a forged password, which effectively improves security of service data processing.

In an embodiment, the signal broadcast module 502 is further configured to broadcast the broadcast signal carrying the numeric value transfer service invitation and additional information, where the additional information includes at least one of the to-be-transferred amount, numeric value receiver identity information, terminal information of the terminal broadcasting the broadcast signal carrying the numeric value transfer service invitation, and the additional information is used to enable the user terminal to display the additional information and receive a selection instruction for the displayed additional information, so as to select the broadcast signal carrying the numeric value transfer service invitation.

Specifically, the signal broadcast module 502 is configured to broadcast the broadcast signal carrying the numeric value transfer service invitation and additional information. The additional information includes but is not limited to at least one of the to-be-transferred amount, the numeric value receiver identity information, and the terminal information of the service terminal. The terminal broadcasting the broadcast signal carrying the numeric value transfer service invitation refers to the service terminal. The terminal information of the service terminal includes a terminal serial number and/or a terminal name and the like, and the numeric value receiver identity information may be, for example, manufacturer information.

The additional information is used to enable the user terminal to: after the user terminal detects the broadcast signal broadcast by the service terminal, acquire and display the additional information carried in the broadcast signal, where the additional information belongs to the foregoing information relevant to the broadcast signal. When multiple broadcast signals carrying numeric value transfer service invitations and additional information exist, the user terminal may be configured to display a list of additional information. The user terminal may be configured to receive a selection instruction for the displayed additional information, so as to select a piece of additional information, and then accordingly select a broadcast signal carrying a numeric value transfer service invitation. The broadcast signal is a broadcast signal according to which a user performs an operation for a numeric value transfer service.

In an embodiment, the connection established by the user terminal is a Bluetooth connection or an NFC connection. The connection is preferably a Bluetooth connection. Compared with an NFC technology, a Bluetooth technology has a larger effective range, so that the user terminal does not need to be very close to the service terminal, which improves convenience during the operation.

In an embodiment, the numeric value transfer service data further includes at least one of a time stamp, terminal information of the user terminal, and a randomly generated number.

Specifically, the time stamp may be a system time or a time of a clock server obtained by the user terminal in real time, and is used for indicating a specific time at which the user terminal authorizes the operation for the numeric value transfer service. When performing authentication according to the numeric value transfer service data, the service server may authenticate the time stamp by determining whether a difference between a current time and the time stamp is within a preset time threshold; and if the difference is within the preset time threshold, it means that the authentication of the time stamp succeeds. In this way, the authentication is more effective, and the implementation of the numeric value transfer service is more secure.

The terminal information of the user terminal may include at least one of a type of the user terminal, a terminal name, a terminal identifier, and the like. The service server may authenticate the terminal information of the user terminal by determining whether the terminal information of the user is in a list of trustable terminals; and if the terminal information exists in the list of trustable terminals, it means that the authentication of the terminal information of the user terminal succeeds.

The user terminal randomly generates a random number, and adds the random number to the numeric value transfer service data sent to the service terminal, which can increase changes of the numeric value transfer service data. In this way, even for a same user, because of existence of random numbers, service data generated each time is different, and therefore character sequences obtained by mapping the numeric value transfer service data and the numeric value transfer password together are various, which prevents a malicious user from decoding content in the numeric value transfer service data by means of exhaustive attack.

In an embodiment, the data sending module 506 may be further configured to enable the service server to perform authentication according to the numeric value transfer service data, and send confirmation request information to the user terminal after the authentication succeeds, and after a confirmation instruction sent by the user terminal in response to the confirmation request information is received, subtract the to-be-transferred amount from the first numeric value account corresponding to the first numeric value account identifier and/or the user identifier and add the to-be-transferred amount to the second numeric value account corresponding to the numeric value receiver identifier.

The service server may be configured to send the confirmation request information to the user terminal by using a short message service message or a service terminal relay, or may send the confirmation request information to the user terminal by using the Internet (such as an e-mail or an instant message). Accordingly, the user terminal may be configured to send the confirmation instruction to the service server in response to the foregoing confirmation request information by using a short message service message, a service terminal relay, the Internet (such as an e-mail or an instant message).

In an embodiment, after the service server is configured to subtract the to-be-transferred amount from the first numeric value account corresponding to the first numeric value account identifier and/or the user identifier and add the to-be-transferred amount to the second numeric value account corresponding to the numeric value receiver identifier, the service server may be configured to return, to the service terminal, result information indicating that the numeric value transfer succeeds. When the authentication fails, the service server may be configured to return, to the service terminal, result information indicating that the numeric value transfer fails.

Figure 6:
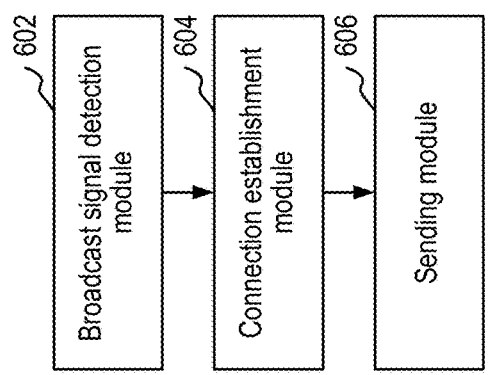
FIG. 6 is a structural block diagram of a user terminal according to an embodiment.

As shown in FIG. 6, in an embodiment, a user terminal is provided, where the user terminal includes: a broadcast signal detection module 602, a connection establishment module 604, and a sending module 606.

The broadcast signal detection module 602 is configured to detect a broadcast signal.

The broadcast signal detection module 602 may be configured to: after receiving an instruction input by a user for starting detection of a broadcast signal, start detecting whether a broadcast signal broadcast by a service terminal and carrying a numeric value transfer service invitation exists. Specifically, the user terminal may include a display module, configured to display a trigger button, and the broadcast signal detection module 602 is configured to: after detecting a click operation of the user on the trigger button, start detecting whether the broadcast signal broadcast by the service terminal and carrying the numeric value transfer service invitation exists.

The connection establishment module 604 is configured to establish a connection to the service terminal according to the numeric value transfer service invitation when detecting the broadcast signal broadcast by the service terminal and carrying the numeric value transfer service invitation.

When the broadcast signal carrying the numeric value transfer service invitation is detected, the connection establishment module 604 may be configured to automatically establish a connection to the service terminal; or the display module may be configured to detect information relevant to the broadcast signal, and is configured to receive a selection instruction of the user for the relevant information, so as to select the broadcast signal carrying the numeric value transfer service invitation, and then the connection establishment module 604 is configured to establish a connection to the service terminal.

The sending module 606 is configured to send numeric value transfer service data to the service terminal, so that the service terminal sends the numeric value transfer service data, a to-be-transferred amount, and a numeric value receiver identifier to a service server, where the numeric value transfer service data includes a first numeric value account identifier and/or a user identifier, and the numeric value transfer service data is used to enable the service server to perform authentication according to the numeric value transfer service data, and after the authentication succeeds, subtract the to-be-transferred amount from a first numeric value account corresponding to the first numeric value account identifier and/or the user identifier and add the to-be-transferred amount to a second numeric value account corresponding to the numeric value receiver identifier.

The sending module 606 is configured to send the numeric value transfer service data to the service terminal, so that the service terminal sends the numeric value transfer service data sent from the user terminal along with the to-be-transferred amount and a numeric value receiver identifier that are locally stored in the service terminal to the service server. The receiver identifier may be a user account obtained by registration, or may be an application identifier, or may be a second numeric value account identifier of a second numeric value account used for receiving the to-be-transferred amount.

The service server is configured to receive the numeric value transfer service data, the to-be-transferred amount, and the numeric value receiver identifier that are sent from the service terminal, and authenticate the numeric value transfer service data, for example, may be configured to determine whether the user identifier or the first numeric value account identifier exists in a numeric value transfer authorization list, or may be configured to determine whether the user identifier and the first numeric value account identifier exist in a numeric value transfer authorization list at the same time and a mapping exits between the two; and if a determining result is yes, it means that the authentication succeeds. The service server may be configured to authenticate a part or all of data included in the numeric value transfer service data.

In an embodiment, after the authentication succeeds, the service server may be configured to send a numeric value transfer request to a bank server by using the first numeric value account identifier and/or the user identifier and a numeric value transfer password corresponding to the first numeric value account identifier and/or the user identifier, so that the bank server subtracts the foregoing to-be-transferred amount from the first numeric value account corresponding to at least one of the first numeric value account identifier and the user identifier and adds the foregoing to-be-transferred amount to the second numeric value account corresponding to the numeric value receiver identifier, so as to complete the numeric value transfer service.

According to the foregoing user terminal, when a service terminal requires a user to perform an operation for a numeric value transfer service, the service terminal broadcasts a broadcast signal carrying a numeric value transfer service invitation. When the broadcast signal is detected, a connection to the service terminal is established according to the numeric value transfer service invitation. Further, numeric value transfer service data is sent to the service terminal by using the established connection, so that the service terminal sends the numeric value transfer service data, a to-be-transferred amount, and a numeric value receiver identifier together to a service server, so that the service server authenticates the numeric value transfer service data and performs an operation of numeric value transfer after the authentication succeeds.

In this way, no connection to the Internet is required, and the operation for the numeric value transfer service can be performed in an offline state by using the online service terminal. Besides, before performing the operation of numeric value transfer, the service server first authenticates the numeric value transfer service data and performs the operation of numeric value transfer only after the authentication succeeds, which ensures security of the operation for the numeric value transfer service.

In an embodiment, the sending module 606 is configured to encrypt the numeric value transfer service data sent to the service terminal, where the numeric value transfer service data is used to enable the service server to perform authentication according to the numeric value transfer service data after the service server decrypts the numeric value transfer service data. Specifically, data sent by the user terminal to the service terminal is encrypted, data sent by the service terminal to the service server is also encrypted, and different encryption algorithms may be used during the two encryption processes. Accordingly, after decrypting the numeric value transfer service data, the service server performs authentication according to the decrypted numeric value transfer service data; and after the authentication succeeds, the service server subtracts the to-be-transferred amount from the first numeric value account corresponding to the first numeric value account identifier and/or the user identifier and adds the to-be-transferred amount to the second numeric value account corresponding to the numeric value receiver identifier. In this way, leakage of the data sent by the user terminal and the service terminal can be prevented, which can ensure security of the entire service data processing process.

In an embodiment, the connection establishment module 604 is further configured to: when multiple broadcast signals are detected, determine that a broadcast signal with the greatest signal strength among the multiple broadcast signals is the broadcast signal carrying the numeric value transfer service invitation, and establish the connection to the service terminal according to the numeric value transfer service invitation.

In an embodiment, the connection establishment module 604 is further configured to: when multiple broadcast signals are detected, calculate physical distance values according to signal strength of the multiple broadcast signals, determine that a broadcast signal corresponding to the smallest physical distance value among the physical distance values obtained by calculation is the broadcast signal carrying the numeric value transfer service invitation, and establish the connection to the service terminal according to the numeric value transfer service invitation.

Figure 7:
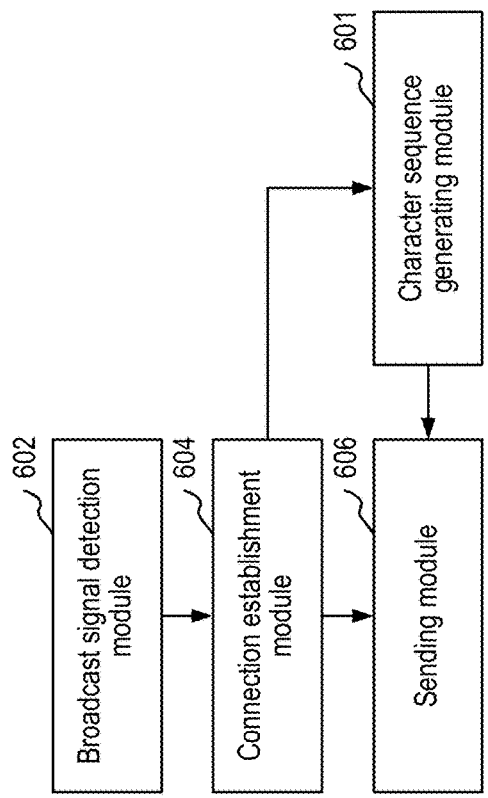
FIG. 7 is a structural block diagram of a user terminal according to another embodiment.

As shown in FIG. 7, in an embodiment, the user terminal further includes a character sequence generating module 601, configured to map the numeric value transfer service data and the numeric value transfer password together, to obtain a character sequence.

The sending module 606 is further configured to send the character sequence to the service terminal, so that the service terminal sends the character sequence to the service server.

The character sequence is used to enable the service server to acquire the numeric value transfer password corresponding to the first numeric value account identifier and/or the user identifier and authenticate the numeric value transfer service data according to the character sequence and the acquired numeric value transfer password.

The character sequence generating module 601 may be configured to map the numeric value transfer service data and the numeric value transfer password together by using an MD5 algorithm, to obtain a character sequence. The numeric value transfer password is stored in the user terminal in a manner of corresponding to the first numeric value account identifier and/or the user identifier. The service terminal is not configured to store the numeric value transfer password. The service server may be configured to acquire the numeric value transfer password corresponding to the first numeric value account identifier and/or the user identifier when the numeric value transfer password is needed.

The character sequence is used to enable the service server to acquire the numeric value transfer password corresponding to the first numeric value account identifier and/or the user identifier from the service server or another server after the service server receives the data sent from the service terminal, and authenticate the numeric value transfer service data according to the character sequence and the acquired numeric value transfer password.

In this embodiment, the character sequence obtained by mapping the numeric value transfer password and the numeric value transfer service data together is used as an authentication means. Because the numeric value transfer password is neither sent to the service server nor transmitted in the Internet, the possibility of leakage of the numeric value transfer password is low. However, when performing authentication according to the numeric value transfer service data, the service server needs to use the numeric value transfer password; in this way, it is difficult for a malicious user to be successfully authenticated by the service server by using forged numeric value transfer service data and a forged password, which effectively improves security of service data processing.

Figure 8:
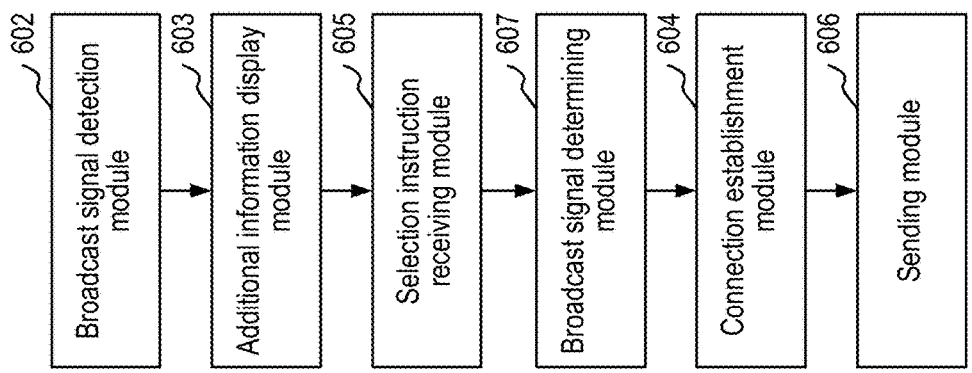
FIG. 8 is a structural block diagram of a user terminal according to still another embodiment.

As shown in FIG. 8, in an embodiment, the broadcast signal detected by the signal broadcast module 602 and carrying the numeric value transfer service invitation also carries additional information, where the additional information includes at least one of the to-be-transferred amount, the numeric value receiver identity information, and the terminal information of the service terminal; and the user terminal further includes: an additional information display module 603, a selection instruction receiving module 605, and a broadcast signal determining module 607.

The additional information display module 603 is configured to display the additional information.

The selection instruction receiving module 605 is configured to receive a selection instruction for the displayed additional information.

The broadcast signal determining module 607 is configured to select, according to the selection instruction, the broadcast signal carrying the numeric value transfer service invitation.

Specifically, the broadcast signal broadcast by the service terminal carries the numeric value transfer service invitation and the additional information at the same time. The additional information includes but is not limited to at least one of the to-be-transferred amount, the numeric value receiver identity information, and the terminal information of the service terminal. The terminal broadcasting the broadcast signal carrying the numeric value transfer service invitation refers to the service terminal. The terminal information of the service terminal includes a terminal serial number and/or a terminal name and the like, and the numeric value receiver identity information may be, for example, manufacturer information.

After the broadcast signal broadcast by the service terminal is detected, the additional information display module 603 is configured to acquire and display the additional information carried in the broadcast signal, where the additional information belongs to the foregoing information relevant to the broadcast signal. When multiple broadcast signals carrying numeric value transfer service invitations and additional information exist, the additional information display module 603 may be configured to display a list of additional information. The selection instruction receiving module 605 is configured to receive a selection instruction for the displayed additional information, and the broadcast signal determining module 607 is configured to select a piece of additional information according to the selection instruction, thereby selecting a broadcast signal carrying a numeric value transfer service invitation.

The connection establishment module 604 is configured to establish a Bluetooth connection or an NFC connection to the service terminal. The connection is preferably a Bluetooth connection. Compared with an NFC technology, a Bluetooth technology has a larger effective range, so that the user terminal does not need to be very close to the service terminal, which improves convenience during the operation.

In an embodiment, the numeric value transfer service data further includes at least one of a time stamp, terminal information of the user terminal, and a randomly generated number.

Specifically, the time stamp may be a system time or a time of a clock server obtained by the user terminal in real time, and is used for indicating a specific time at which the user terminal authorizes the operation for the numeric value transfer service. When performing authentication according to the numeric value transfer service data, the service server may authenticate the time stamp by determining whether a difference between a current time and the time stamp is within a preset time threshold; and if the difference is within the preset time threshold, it means that the authentication of the time stamp succeeds. In this way, the authentication is more effective, and the implementation of the numeric value transfer service is more secure.

The terminal information of the user terminal may include at least one of a type of the user terminal, a terminal name, a terminal identifier, and the like. The service server may authenticate the terminal information of the user terminal by determining whether the terminal information of the user is in a list of trustable terminals; and if the terminal information exists in the list of trustable terminals, it means that the authentication of the terminal information of the user terminal succeeds.

The user terminal randomly generates a random number, and adds the random number to the numeric value transfer service data sent to the service terminal, which can increase changes of the numeric value transfer service data. In this way, even for a same user, because of existence of random numbers, service data generated each time is different, and therefore character sequences obtained by mapping the numeric value transfer service data and the numeric value transfer password together are various, which prevents a malicious user from decoding content in the numeric value transfer service data by means of exhaustive attack.

In an embodiment, the numeric value transfer service data is further used to enable the service server to perform authentication according to the numeric value transfer service data, send confirmation request information to the user terminal after the authentication succeeds, and after a confirmation instruction sent by the user terminal in response to the confirmation request information is received, subtract the to-be-transferred amount from the first numeric value account corresponding to the first numeric value account identifier and/or the user identifier and add the to-be-transferred amount to the second numeric value account corresponding to the numeric value receiver identifier.

The service server may be configured to send the confirmation request information to the user terminal by using a short message service message or a service terminal relay, or may send the confirmation request information to the user terminal by using the Internet (such as an e-mail or an instant message). Accordingly, the sending module 606 may be configured to send the confirmation instruction to the service server in response to the foregoing confirmation request information by using a short message service message, a service terminal relay, the Internet (such as an e-mail or an instant message).

In an embodiment, after the service server is configured to subtract the to-be-transferred amount from the first numeric value account corresponding to the first numeric value account identifier and/or the user identifier and add the to-be-transferred amount to the second numeric value account corresponding to the numeric value receiver identifier, the service server may be configured to return, to the service terminal, result information indicating that the numeric value transfer succeeds. When the authentication fails, the service server may be configured to return, to the service terminal, result information indicating that the numeric value transfer fails.

As noted in the background, it has been a challenge to request a service using a terminal device (e.g., a mobile phone) when the terminal device has no access to the Internet. The aforementioned embodiments are directed to a method of performing a commercial transaction in connection with a service request initiated by a user terminal that is offline. The scenario in which a user wants to initiate a service request from his/her terminal, e.g., a smartphone, while the terminal is offline is not uncommon at all. For example, people often host a carnival at a remote site that has a large parcel of land to attract a large number of visitors. Along with the large number of visitors are many service providers such as food stands, food trucks, gift shops, etc. Nowadays, more and more service providers are open to accepting online payments using a consumer's mobile terminal. But very often, such remote site may have little or no wireless communication signal. Without reliable wireless signal, a user cannot authenticate an online payment from his/her mobile terminal and therefore cannot enjoy the convenience bestowed by many online payment platforms. As further illustrated below, the present application is directed to a method of processing service data to complete a commercial transaction in response to a service request initiated by an offline user terminal.

FIGS. 9A-9C are block diagrams illustrating information exchanges between service terminals and user terminals according to some embodiments. As shown in FIG. 9A, the service providers 900-1, 900-2, . . . , 900-N are different food trucks that are stationed at a carnival site temporarily providing food service. Each food truck (e.g., 900-1) has a service terminal 920-1 (e.g., a point-of-sales machine) for completing commercial transactions with its customers. In this example, the service terminal 920-1 is configured to have a reliable network connection to a remote server (e.g., an online payment system server), which may be a wired connection (e.g., a telephone line) or a wireless connection (e.g., a Wi-Fi service provided by the carnival organizer). In addition, the service terminal 920-1 has a wireless signal transceiver for communicating with user terminals within the vicinity. As noted above, this wireless signal transceiver may support wireless communication protocols such as Wi-Fi, Bluetooth, and NFC, etc. Note that each service provider has a unique service identifier (e.g., the QR codes 920). When a guest of the carnival wants to purchase food from any of the food trucks, the guest first uses his/her terminal device to capture the service provider identifier of a food truck (e.g., scanning the QR code) and then receives service information broadcast by the food truck's service terminal. By selecting one of the service items from his/her terminal device, the guest can order the food of his/her choice and also make an online payment through the corresponding service terminal.

Figure 10:
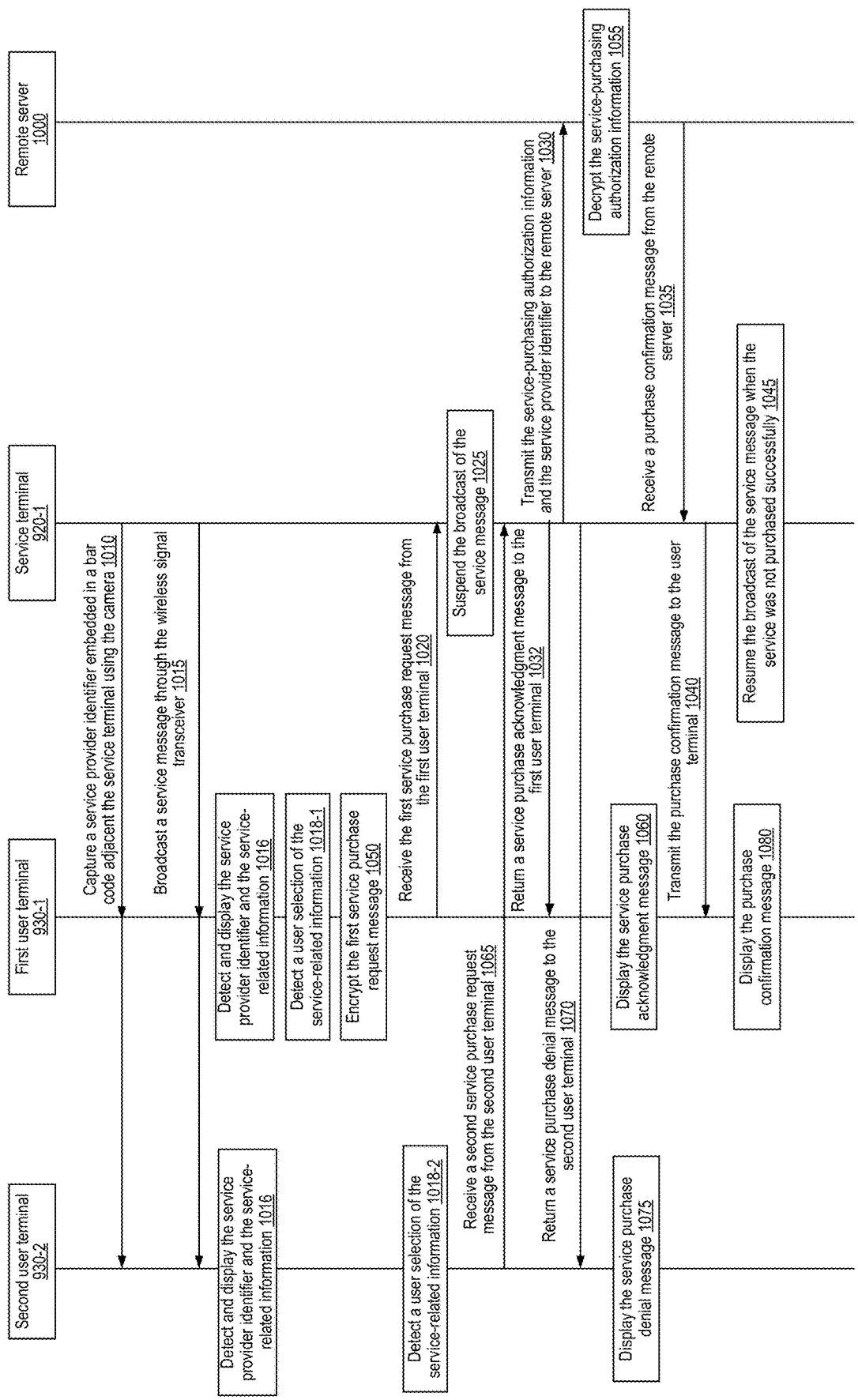
FIG. 10 is a schematic flowchart illustrating information exchanges between two user terminals and a service terminal according to some embodiments.

FIG. 10 is a schematic flowchart illustrating an information exchange process between two user terminals and a service terminal according to some embodiments. For illustrative purposes, the process will be described in the context of a user using his/her mobile device to order food from one of the food trucks at the carnival as described above in connection with FIGS. 9A-9C. As noted above, each food truck has a unique service provider identifier in the form of a QR code. In order to avoid confusion, when the food truck broadcasts its service information (e.g., a food order is completed), it broadcasts the unique service provider identifier along with the service information (e.g., encoding the service information using the unique service provider identifier). In order to receive the service information, a user terminal should have the unique service provider identifier before the broadcast of the service information. In some embodiments, a user may first visit a food truck of his/her interest (e.g., 900-1) and capture (1010) the unique service provider identifier by scanning the QR code 910-1 using an application running on his/her user terminal. Using the unique service provider identifier, the user terminal can decode the service information from the food truck 900-1. Note that scanning QR code is one exemplary approach of receiving the service provider identifier. In some other embodiments, the service terminal (e.g., 920-1) may broadcast its service provider identifier periodically using its wireless signal transmitter.

In some embodiments, a food truck prepares food based on orders placed by its customers. In some other embodiments, a food truck prepares food before receiving any customer orders. In either case, the food truck may use its service terminal to broadcast information about the food that it serves. In this example, it is assumed that the service terminal 920-1 at the food truck 900-1 repeatedly broadcasts (1015) a service message through its wireless signal transmitter, the service message including the service provider identifier of the food truck 900-1 and the service-related information, the name and price of a food item it has prepared. In some embodiments, the service message is broadcast within a short distance from the food truck using the Bluetooth protocol so that only user terminals adjacent the food truck can pick up the signal carrying the service message.

Upon detecting the service message, both the first user terminal 930-1 and the second user terminal 930-2 display (1016) the service provider identifier and the service-related information to the respective user. The service provider identifier is used for distinguishing one service provider from another service provider since the user may be interested in the food service provided by multiple food trucks adjacent to each other by scanning their unique QR codes in advance. As shown in FIG. 9B, both the first user terminal 930-1 and the second user terminal 930-2 receive the service message and display it on their screen. If a user is interested in purchasing the food, he or she can select the food item by clicking the icon "Buy it!" on the screen. In response to the user selection of the service-related information (1018-1), the first user terminal 930-1 generates a first service purchase request message and transmits (1020) the first service purchase request message wirelessly to the service terminal 920-1 using its wireless signal transceiver, the first service purchase request message including the service-related information and service-purchasing authorization information. In some embodiments, the service provider identifier is a public account identifier of a social networking application (e.g., WeChat by Tencent) and the service-purchasing authorization information includes an identifier of the first user terminal 930-1 and a user account identifier of the social media application. It is assumed that the user account identifier of the social media application has an associated bank account so that the user account identifier transmitted from the first user terminal can be used to authorize online payment from the bank account. In some embodiments, the first user terminal may encrypt (1050), at least partially, the first service message using, e.g., the user account identifier so that only the remote server 1000 can decrypt the first service message whereas the service terminal 920-1 cannot.

As noted above, the service message was initially broadcast by the service terminal 920-1. The first user terminal 930-1 may not be the only user terminal that receives the service message. Assuming that the second user terminal 930-2 also detects the service provider identifier and the service-related information, the second user terminal 930-2 may display the information on its screen as shown in FIG. 9B. In response to a user selection of the service-related information (1018-2), the second user terminal 930-2 may also generate a second service purchase request message and transmit (1065) the second service purchase request message wirelessly to the service terminal 920-1 using its wireless signal transceiver, the second service purchase request message including the service-related information and service-purchasing authorization information. In this example, it is assumed that the food A has been prepared and served on a first-come-first-serve" basis. In response to receiving the first purchase request message from the first user terminal 930-1, the service terminal then suspends (1025) the broadcast of the service message to avoid receiving more service purchase messages for the food item identified in the service message with an assumption that the food item identified in the service message is going to be sold to the user of the first user terminal 930-1 who submits the first service purchase request message. In some embodiments, the service terminal 920-1 returns a response message to each service purchase request message it receives to let the corresponding user know whether the user's service purchase request message has been accepted or not. As shown in FIG. 9C, the service terminal 920-1 may return (1032) a service purchase acknowledgement message to the first user terminal, the service purchase acknowledgement message indicating that the user's request for purchasing the food item has been received and accepted. By doing so, the user does not need to submit another service purchase request message for the same or another food item. Similarly, the service terminal 920-1 also returns (1070) a service purchase denial message to the second user terminal 930-2, the service purchase denial message indicating that the service terminal does not accept the second user's service purchase request. By displaying (1075) the service purchase denial message, the user is reminded that the food item has been taken by another user and the user needs to submit another service purchase request message for another food item.

After suspending the broadcast of the service message, the service terminal 920-1 transmits (1030) the service-purchasing authorization information and the service provider identifier to the remote server 1000 to perform a commercial transaction between the user account identifier associated with the first user terminal 930-1 and the service provider identifier associated with the food truck. To do so, the remote server 1000 may decrypt (1055) the service-purchasing authorization if it was encrypted by the first user terminal 930-1 and retrieve the user account identifier and its associated bank account as well as the amount of the transaction from the service-purchasing authorization (i.e., the price of the food item). If the bank account has a credit balance greater than the amount of the transaction, the remote server 1000 deducts the amount of the transaction from the bank account and accredit to a bank account associated with the service provider identifier. If the bank account does not have a credit balance greater than the amount of the transaction, the remote server 1000 will abort the commercial transaction. In either case, the remote server 1000 returns (1035) a purchase confirmation message to the service terminal 920-1, the purchase confirmation message indicating whether the bank account associated with the user of the first user terminal 930-1 has been successfully charged or not. Based on the purchase confirmation message, the operator of the service terminal 920-1 can determine whether or not to release the food item to the user of the first user terminal 930-1. In some embodiments, the service terminal 930-1 also transmits (1040) the purchase confirmation message to the first user terminal 930-1 via the same wireless connection between the two terminals to remind the user of the first user terminal 930-1 whether the service purchase request initiated by the user has been completed successfully or not. The first user terminal 930-1 may display (1080) the purchase confirmation message on its screen to remind the user that he or she can pick up the food item he or she purchased previously. Note that a screenshot like the one shown in FIG. 9C may be used to indicate whether the purchase transaction is completed successfully or not.

In some embodiments, the first user terminal 930-1 includes a purchase confirmation number and a current timestamp of the first user terminal in the first purchase request message as part of the service-purchasing authorization information. The purchase confirmation number may be randomly generated by the first user terminal 930-1 itself or entered by the user of the first user terminal 930-1. This purchase confirmation number is kept at the service terminal 920-1 so that a customer needs to provide his/her purchase confirmation number to verify his/her identity when claiming the food item he or she purchased. In some other embodiments, when the purchase confirmation message indicates that the purchase order is not completed successfully (e.g., due to the lack of credit balance at the bank account or the user's change of mind, etc.), the service provider may resume (1045) the broadcast of the service message until it is finally sold successfully or when other predefined conditions are met.

Note that the process described above in connection with FIG. 10 does not require that either of the first and second user terminals have a wireless or wired Internet connection. In other words, the two user terminals are offline during the entire transaction for the purchase of authorizing the remote server 1000 to perform a commercial transaction between two bank accounts. The two user terminals only need to have a short-range wireless connection with the service providers that complies with a wireless communication protocol such as Bluetooth, WiFi, and NFC for the purpose of purchasing a product or service offered by a particular service provider. Extra measures such as partial encryption of the service-purchasing authorization information at the first user terminal, including a purchase confirmation number in the service purchase request message, and returning service purchase acknowledgment/denial messages to respective user terminals make this process not only safe but also convenient in a place where there is no reliable wireless connection for the user of a mobile terminal to make purchase and authenticate such purchase from the mobile terminal directly.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method performed at a service terminal having one or more processors and memory and a short-range wireless signal transceiver, wherein the service terminal is communicatively coupled to a remote server, the method comprising:
　repeatedly broadcasting, via the short-range wireless signal transceiver, a service message including a first user account identifier of a social networking application and service-related information;
　receiving, via the short-range wireless signal transceiver, a service purchase request message from a mobile phone adjacent the service terminal, wherein the mobile phone transmits the service purchase request message via a short-range wireless signal transceiver in the mobile phone and the service purchase request message includes a second user account identifier of the social networking application and service-purchasing authorization information corresponding to the service-related information via the mobile phone;
　in response to receiving the service purchase request message:
　　transmitting the first user account identifier of the social networking application, the second user account identifier of the social networking application, and the service-purchasing authorization information to the remote server, wherein the remote server performs an operation between the first user account identifier and the second user account identifier according to the service-purchasing authorization information;
　　receiving a purchase confirmation message from the remote server; and
　　transmitting, via the short-range wireless signal transceiver, the purchase confirmation message to the mobile phone.

2. The method of claim 1, wherein the mobile phone is in an off-line state from the social media application when receiving the service purchase request message from the service terminal.

3. The method of claim 1, wherein the service-purchasing authorization information further includes a purchase confirmation number and a current timestamp of the mobile phone when generating the service purchase request message.

4. The method of claim 1, wherein the mobile phone is configured to acquire the first user account identifier of the social networking application by scanning a bar code before receiving the service message.

5. The method of claim 1, wherein the short-range wireless signal transceiver is configured to comply with a wireless communication protocol selected from the group consisting of Bluetooth, WiFi, and NFC.

6. The method of claim 1, wherein the service-purchasing authorization information is partially encrypted by the mobile phone before its being transmitted to the service terminal and the remote server is configured to decrypt the partially-encrypted service-purchasing authorization information before generating the purchase confirmation message.

7. The method of claim 1, further comprising:
　after receiving the service purchase request message from the mobile phone:
　　temporarily suspending the broadcast of the service message;
　　determining whether the service was rendered successfully or not in accordance with the purchase confirmation message; and
　　resuming, via the short-range wireless signal transceiver, the broadcast of the service message in accordance with a determination that the service was not rendered successfully.

8. The method of claim 1, further comprising:
　in response to receiving the service purchase request message:
　　returning, via the short-range wireless transceiver, a service purchase acknowledgment message to the mobile phone, wherein the mobile phone is configured to display the service purchase acknowledgment message on its screen.

9. A service terminal, comprising:
one or more processors;
a short-range wireless signal transceiver;
memory; and
one or more programs stored in the memory and to be executed by the one or more processors, wherein the service terminal is communicatively coupled to a remote server, the one or more programs further including instructions for:
repeatedly broadcasting, via the short-range wireless signal transceiver, a service message including a first user account identifier of a social networking application and service-related information;
receiving, via the short-range wireless signal transceiver, a service purchase request message from a mobile phone adjacent the service terminal, wherein the mobile phone transmits the service purchase request message via a short-range wireless signal transceiver in the mobile phone and the service purchase request message includes a second user account identifier of the social networking application and service-purchasing authorization information corresponding to the service-related information via the mobile phone;
in response to receiving the service purchase request message:
transmitting the first user account identifier of the social networking application, the second user account identifier of the social networking application, and the service-purchasing authorization information to the remote server, wherein the remote server performs an operation between the first user account identifier and the second user account identifier according to the service-purchasing authorization information;
receiving a purchase confirmation message from the remote server; and
transmitting, via the short-range wireless signal transceiver, the purchase confirmation message to the mobile phone.

10. The service terminal of claim 9, wherein the mobile phone is in an off-line state from the social media application when receiving the service purchase request message from the service terminal.

11. The service terminal of claim 9, wherein the service-purchasing authorization information further includes a purchase confirmation number and a current timestamp of the mobile phone when generating the service purchase request message.

12. The service terminal of claim 9, wherein the mobile phone is configured to acquire the first user account identifier of the social networking application by scanning a bar code before receiving the service message.

13. The service terminal of claim 9, wherein the short-range wireless signal transceiver is configured to comply with a wireless communication protocol selected from the group consisting of Bluetooth, WiFi, and NFC.

14. The service terminal of claim 9, wherein the service-purchasing authorization information is partially encrypted by the mobile phone before its being transmitted to the service terminal and the remote server is configured to decrypt the partially-encrypted service-purchasing authorization information before generating the purchase confirmation message.

15. The service terminal of claim 9, wherein the one or more programs further include instructions for:
after receiving the service purchase request message from the mobile phone:
temporarily suspending the broadcast of the service message;
determining whether the service was rendered successfully or not in accordance with the purchase confirmation message; and
resuming, via the short-range wireless signal transceiver, the broadcast of the service message in accordance with a determination that the service was not rendered successfully.

16. The service terminal of claim 9, wherein the one or more programs further include instructions for:
in response to receiving the service purchase request message:
returning, via the short-range wireless transceiver, a service purchase acknowledgment message to the mobile phone, wherein the mobile phone is configured to display the service purchase acknowledgment message on its screen.

17. A non-transitory computer readable storage medium storing one or more programs that are configured to be executed by a service terminal one or more processors and a short-range wireless signal transceiver, wherein the service terminal is communicatively coupled to a remote server, the one or more programs further including instructions for:
repeatedly broadcasting, via the short-range wireless signal transceiver, a service message including a first user account identifier of a social networking application and service-related information;
receiving, via the short-range wireless signal transceiver, a service purchase request message from a mobile phone adjacent the service terminal, wherein the mobile phone transmits the service purchase request message via a short-range wireless signal transceiver in the mobile phone and the service purchase request message includes a second user account identifier of the social networking application and service-purchasing authorization information corresponding to the service-related information via the mobile phone;
in response to receiving the service purchase request message:
transmitting the first user account identifier of the social networking application, the second user account identifier of the social networking application, and the service-purchasing authorization information to the remote server, wherein the remote server performs an operation between the first user account identifier and the second user account identifier according to the service-purchasing authorization information;
receiving a purchase confirmation message from the remote server; and
transmitting, via the short-range wireless signal transceiver, the purchase confirmation message to the mobile phone.

18. The non-transitory computer readable storage medium of claim 17, wherein the mobile phone is in an off-line state from the social media application when receiving the service purchase request message from the service terminal.

19. The non-transitory computer readable storage medium of claim 17, wherein the service-purchasing authorization information further includes a purchase confirmation number and a current timestamp of the mobile phone when generating the service purchase request message.

20. The non-transitory computer readable storage medium of claim 17, wherein the short-range wireless signal transceiver is configured to comply with a wireless communication protocol selected from the group consisting of Bluetooth, WiFi, and NFC.

* * * * *